(12) United States Patent
Lok

(10) Patent No.: US 11,864,096 B1
(45) Date of Patent: Jan. 2, 2024

(54) AUTONOMOUS, ARTIFICIALLY INTELLIGENT, AND FULLY DISTRIBUTED WI-FI INFRASTRUCTURE

(71) Applicant: Aidan Lok, Howard Beach, NY (US)

(72) Inventor: Aidan Lok, Howard Beach, NY (US)

( * ) Notice: Subject to any disclaimer, the term of this patent is extended or adjusted under 35 U.S.C. 154(b) by 0 days.

(21) Appl. No.: 18/178,027

(22) Filed: Mar. 3, 2023

(51) Int. Cl.
  *H04W 4/00* (2018.01)
  *H04W 48/16* (2009.01)
  *H04W 84/12* (2009.01)

(52) U.S. Cl.
  CPC ............ *H04W 48/16* (2013.01); *H04W 84/12* (2013.01)

(58) Field of Classification Search
  CPC ..... H04W 48/16; H04W 84/12; H04W 84/18; H04W 8/26; H04W 88/06
  USPC .......................................................... 370/338
  See application file for complete search history.

(56) References Cited

U.S. PATENT DOCUMENTS

| | | | |
|---|---|---|---|
| 10,932,183 B1* | 2/2021 | Strong ................... | H04W 48/12 |
| 2017/0272317 A1* | 9/2017 | Singla ..................... | H04L 41/12 |
| 2017/0273122 A1* | 9/2017 | Hu ......................... | H04W 12/06 |

\* cited by examiner

*Primary Examiner* — Temica M Beamer
(74) *Attorney, Agent, or Firm* — Miller IP Law

(57) ABSTRACT

Autonomous, artificially intelligent, and fully distributed Wi-Fi infrastructure systems are described herein. The system includes nodes including sensing Wi-Fi radios, data Wi-Fi radios, processing devices, memory devices and software modules. The software modules include a sensor module, an accumulator module, a solver module and a configuration generator module. The software module is configured to scan for used and available Wi-Fi frequencies, and automatically generate an optimal Wi-Fi network solution based on radio resource management and co-channel interference.

20 Claims, 14 Drawing Sheets

Network with Five APs
Before Detection of Interference

Network with Five APs
and Interference

Network with 10 APs
Before Detection of Interference

Network with 10 APs
and Interference

Network with 20 APs
Before Detection of Interference

Network with 20 APs and Interference

Network Before Detection of Interference

Network with One Interference

Network Before Detection of Interference

Network with Two Interference

AUTONOMOUS, ARTIFICIALLY INTELLIGENT, AND FULLY DISTRIBUTED WI-FI INFRASTRUCTURE

BACKGROUND

Wi-Fi systems have become ubiquitous in modern electronic communication, information retrieval, maintenance of electronic systems and countless other uses. Most residences rely on a single access point that is hardwired into a broadband internet system. Larger commercial and/or industrial wireless networks can have multiple access points to assist with the larger and most distributed inflow and outflow of electronic data. Various systems and methods exist to service both residential and commercial grade wireless networks widely ranging in available bandwidth, complexity and cost.

BRIEF DESCRIPTION OF THE DRAWINGS

The present description will be understood more fully when viewed in conjunction with the accompanying drawings of various examples of autonomous, artificially intelligent, and fully distributed Wi-Fi infrastructure. The description is not meant to limit the systems and methods to the specific examples. Rather, the specific examples depicted and described are provided for explanation and understanding of autonomous, artificially intelligent, and fully distributed Wi-Fi infrastructure. Throughout the description, the drawings may be referred to as drawings, figures, and/or FIGs.

DETAILED DESCRIPTION

Figure 1:
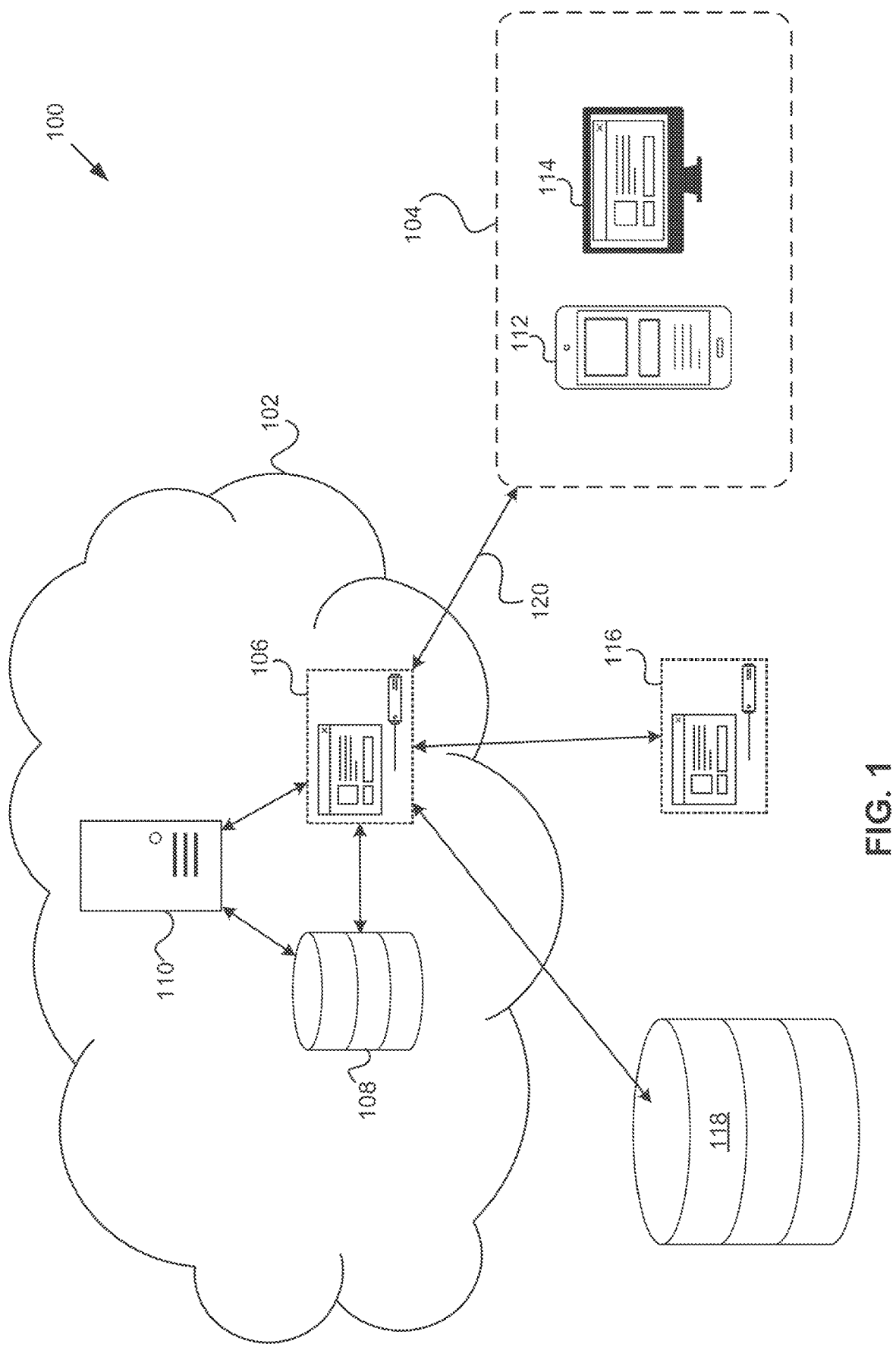
FIG. 1 illustrates an autonomous, artificially intelligent, and fully distributed Wi-Fi system, according to an embodiment.

Autonomous, artificially intelligent, and fully distributed Wi-Fi infrastructure as disclosed herein will become better understood through a review of the following detailed description in conjunction with the figures. The detailed description and figures provide merely examples of the various embodiments of autonomous, artificially intelligent, and fully distributed Wi-Fi infrastructure. Many variations are contemplated for different applications and design considerations; however, for the sake of brevity and clarity, all the contemplated variations may not be individually described in the following detailed description. Those skilled in the art will understand how the disclosed examples may be varied, modified, and altered and not depart in substance from the scope of the examples described herein.

The United States federal government has determined that internet access is a critical utility. High-density properties deploy public access Wi-Fi networks that are often the only way for people to access the internet because indoor cellular service is often suboptimal. Remote cell towers often cannot penetrate the walls of buildings and distributed antenna systems are costly. Public safety and government first responders often rely on public Wi-Fi infrastructures to communicate with each other. Wi-Fi infrastructures can become crucial in disaster where the Wireless Wide Area Network (WWAN) infrastructure has been rendered inoperable.

Wi-Fi networks have become very ubiquitous and critical in modern society. However, minimal cost and best-effort service delivery are often the criteria for most public access Wi-Fi networks. Best-effort networks are inappropriate for mission-critical applications, such as public safety and sensitive site surveillance. There are at least two ways to solve the issues related to best-effort networks. One way is to design for reliability by deploying a network infrastructure that guarantees a high level of service. However, equipment capable of guaranteeing a high level of service typically costs many multiples that of best-effort networking gear. Another possible solution is to deploy additional access points beyond the original specification using the best-effort networking equipment. This approach is preferred due to lower cost, and more readily available equipment. However, additional access points are best utilized in conjunction with pre and post-installation site surveys.

There are a limited number of Wi-Fi channels available to use and poor channel planning results in co-channel interference (CCI) that degrades network performance, and/or causes network failure. A properly configured network employs radio resource management (RRM) techniques to avoid co-channel interference and maximize network performance. Post-installation wireless site surveys supply interference data as a starting point to define configuration and ensure proper network operation. However, the results of surveys do not always reflect reality because the test environment is typically isolated. Furthermore, the skill level of the engineer can affect the results. Even the direction the engineer faces while taking measurements can affect the results. Another factor that can affect the results is the position of moveable objects such as doors and furniture. As an example, if a network engineer performs a wireless site survey in a new mall the day before it opens, the closed metal gates over the entrances to the shops can negatively affect the results. Additionally, the lack of interference from people and other devices can positively affect the results.

Wireless site surveys are resource-intensive and time-consuming but are necessary to properly manage radio resources. To perform a proper site survey, a network engineer must walk the entire property with heavy equipment to measure signal strength every few feet. This is a physically and mentally taxing job that is time-consuming and costly. Because of these limitations, site surveys are rarely performed after the network deployment is complete. A daily wireless site survey to validate network operation is ideal to ensure end-user satisfaction. However, it is costly, time consuming and often impractical to use industry-standard tools to perform frequent wireless site survey. Both site surveys and radio resource management are necessary for best effort networks to operate correctly, but they are currently costly, inefficient and time-consuming manual processes. Wi-Fi infrastructures can benefit from an artificially intelligent system that can execute automated site surveys and interpret the results to automatically perform radio resource management without human intervention.

Wi-Fi systems are generally composed of one or more wireless access points that route or bridge wireless traffic onto a wireline or hardwired network. Wi-Fi systems are typically implemented as small-scale consumer systems that are limited to one to three wireless access points (AP) ("consumer Wi-Fi systems"), or as large-scale controller-based enterprise Wi-Fi systems ("enterprise Wi-Fi systems") that can scale to thousands of wireless access points. Consumer Wi-Fi systems are usually unable to scale beyond three access points and are therefore not worth considering for automated site surveys and radio resource management. Enterprise Wi-Fi systems employ centralized controllers to minimize the cost of access points by performing the control and management computation in a single dedicated device. Enterprise Wi-Fi system architecture enables manufacturers to produce enterprise access points with minimal central processing units (CPUs) to control costs. The desire to minimize cost also results in very few enterprise access points being manufactured with specialized sensing equipment. Enterprise Wi-Fi systems allow customers to only pay for the minimal processing power required for central management, as opposed to paying for many access points with CPU power and capability. Unfortunately, single centralized controllers introduce a single point of failure, as the Wi-Fi network can cease operation when the controller fails.

Another problem with enterprise Wi-Fi networks is that radio resource management is typically a manual process that is completed in conjunction with site surveys. The network administrator must manually assign a channel to each access point in the controller graphical user interface (GUI). While there are some systems that use automated sensing to drive automated radio resource management, these systems tend to be costly and utilize centralized controllers. Additionally, implementations of automated radio resource management in commercial systems often interrupt client connectivity to scan for radio resource management. Approaches to these problems have failed to take advantage of recent advances in single-board computers (SBCs).

One solution to the above-described problems is to provide a scalable Wi-Fi system incorporating single board computers ("SBCs"), such as the Raspberry Pi 4 Model B SBCs. NVIDIA's Jetson line of products (e.g. the Jetson Xavier NX Developer Kit), Seeed Studio's ODYSSEY X86J4105800, Khadas' VIM3, ZimaBoard's 832-X86 or similar SBC, in exchange for enterprise access points and controllers. The use of the SBCs can create an autonomous, artificially intelligent, and fully distributed real-time sensor-driven radio resource management system that is directly integrated into the Wi-Fi system. The system can perform continuous site surveys and reconfigure the Wi-Fi network to maximize network performance through the minimization of co-channel interference.

The SBC, e.g., a Raspberry Pi 4 Model B single-board computer can be the base platform for a device that can execute software modules for the distributed Wi-Fi system. Raspberry Pi 4 Model B SBCs incorporate a single onboard Wi-Fi radio, other SBC can be used and/or prepared that have more than one Wi-Fi radio. One of the radios on the SBC can be used by the distributed Wi-Fi system to act as the sensor used to perform a continuous site survey. In an embodiment, a USB port on the Raspberry Pi 4 Model B SBCs can be used to attach a second Wi-Fi radio that can be dedicated for end-user traffic. The SBC acts as a node for the distributed Wi-Fi system. Each node can have multiple radios, which allows the node to conduct continuous site surveys while the additional radio provides uninterrupted client connectivity, or end-user traffic. The SBC can be attached to a Power over Ethernet (PoE) hardware attached on top (HAT) to enable power delivery via one or more Ethernet switches. Similar PoE HAT systems are known for enterprise Wi-Fi architecture.

The processing power available in SBCs, e.g., a Raspberry Pi 4 Model B SBC, is greater than found in standard wireless access points. Enterprise wireless access point systems generally centralize the processing in a controller that is either on-premises or cloud-based. Enterprise Wi-Fi architecture is generally designed to minimize the cost of the individual access points. Enterprise Wi-Fi architectures generally do not include sensor radios and high-power processors at the access points. Additionally, enterprise Wi-Fi architectures generally depend on the availability of a central controller, which introduces a single point of failure to the system.

Single-board computers can provide Wi-Fi architectures that provide continuous wireless site surveys combined with real-time distributed radio resource management. SBCs, e.g., a Raspberry Pi 4 Model B SBCs can be used to implement a fully autonomous, artificially intelligent, and fully distributed Wi-Fi infrastructure with continuously adaptive radio resource management that maximizes network performance by minimizing co-channel interference (CCI). The system can further include four software modules: (1) a sensor module that performs continuous site surveys; (2) an accumulator module that inspects global sensor data to determine what networks are in the environment; (3) a solver module that implements the channel selection algorithm to determine channel configurations; and (4) a configuration generator module that that assigns channels to each access point. The system can produce channel configurations that minimize co-channel interference when three variables, the number of access points, the maximum number of radiofrequency adjacencies between access points, and the number of interferences are independently modified. The system's radio resource management has been demonstrated to outperform a Ruckus Wireless Wi-Fi network when a mobile hotspot was artificially introduced to a live Wi-Fi network. The present system is superior to currently available commercial enterprise and consumer Wi-Fi systems because the present system performs radio resource management continuously, autonomously, and intelligently. The present system obviates the need for labor-intensive manual wireless site surveys and channel management. Additionally, the present system is fully distributed as each SBC performs radio resource management for locally attached radios with global broadcast synchronization removing the need for a central controller, a potential single point of failure for the commercial Wi-Fi systems.

Single board computers having Wi-Fi radios can be implemented as a system on chip (SoC), where all of the electronics needed for a network node are on an integrated circuit. Each node may include, for example, a processing device, a memory device, and at least two Wi-Fi antennas, which can be connected via a miniature radiofrequency (e.g., U.FL) connector to a coaxial (e.g., RP-SMA) cable, which can act as an access point. Single board computer firmware can manage the site surveys, the radio resource management, internet traffic, as well as other features of the SBC. The system may be effective in various environments, including indoor, urban, suburban, and rural environments.

The system can include a software application running on an SBC, a smartphone, tablet or computer to provide a graphical user interface (GUI) to the end-users. The software application may be specifically designed to communicate between nodes. The system can be used to communicate with a mesh network established by a multitude of nodes. Commands and/or data transmissions (messages) input to the software application GUI may be forwarded to all nodes on the network. The commands and/or data transmissions can include metadata and other content. The software application may then display any received commands, data transmissions, messages, or processed data (including, metadata and other content) on the GUI.

The nodes can include an inter-node communication system. The software can recognize messages and determine whether the message should not be forwarded again. A cache of all messages sent or received may be implemented to avoid broadcast storms. The inter-node communication mechanism in the nodes may enable a mesh network having a total range as large as needed. Propagation delay may increase as the size of the network increases.

In an example embodiment of the SBC firmware, the nodes may communicate over Wi-Fi. A hypertext transfer protocol (HTTP) web server may only respond to specifically formatted HTTP GET and POST transactions. The nodes may receive messages from other nodes via HTTP POST transactions. The sender of the message, the timestamp of when the message was sent, as well as the body of the message (e.g., the message content) may be extracted from each HTTP POST request and stored in the node's memory. The list of all messages stored in the node's memory may be returned as a server response to all HTTP GET transactions.

A second component of the node's firmware in the example embodiment can manage the Wi-Fi system used to forward messages between nodes. Messages received by the nodes from other nodes over HTTP POST may be transmitted via Wi-Fi. The node firmware may utilize a first in first out (FIFO) queue of all messages. The list of messages (commands and/or data transmissions) stored in the node's memory in the FIFO queue may be used to exclude previously seen messages. If the message is new, the node may add the message to the FIFO queue and retransmit the message over Wi-Fi to implement an SNCF mesh network architecture.

A smart device application, for use with the nodes, can include two parts: a communication mechanism that allows the app to send messages to the nodes, and allowing the app to collect commands, data transmissions and/or messages from the nodes, and a GUI that displays received commands, data transmissions and/or messages and allows the end-user to input commands, data transmissions and/or messages for the app to send. The user smart device app may function over any wireless medium using any standard protocol, but HTTP may be implemented in various embodiments. The GUI may be on a user smart device. The GUI may have an internal data store that it uses to store and compare information that it has received from nodes. The GUI may also instruct the nodes to gather information so that it can present new information to the user.

In the example embodiment, the user smart device application may be an HTTP client that can perform HTTP POSTs and HTTP GETs to send and receive commands, data transmissions and/or messages, respectively. The user smart device application can send an HTTP POST request to the nodes when the user sends commands, data transmissions and/or messages. The application may also send an HTTP GET request to the nodes every second to see if any new commands, data transmissions and/or messages have been received. The user smart device app may compare the received commands, data transmissions and/or messages list against a local copy. New commands, data transmissions and/or messages may be added to the GUI if they are present in the received list but not the local copy.

The nodes may include a battery and/or be hardwired for power or receive power over ethernet ("PoE"). Each node can include a multi-bearer radio array, which may be implemented as a Wi-Fi-enabled SBC.

FIG. 1 illustrates an artificially intelligent, and fully distributed Wi-Fi system 100 ("the system" 100), according to an embodiment. The system 100 includes internal and external data resources for the system 100. The system 100 can result in reduced memory allocation at client devices and may conserve memory resources for application servers.

The system 100 can include a cloud-based data management system 102 and a user device 104. The cloud-based data management system 102 may include an application server 106, a database 108, and a data server 110. The user device 104 may include one or more devices associated with user profiles of the system 100, such as a smartphone 112 and/or a personal computer 114. The system 100 may include external resources such as an external application server 116 and/or an external database 118. The various elements of the system 100 may communicate via various communication links 120. An external resource may generally be considered a data resource owned and/or operated by an entity other than an entity that utilizes the cloud-based data management system 102 and/or the user device 104.

The system 100 may be web-based. The user device 104 may access the cloud-based data management system 102 via an online portal set up and/or managed by the application server 106. The system 100 may be implemented using a public internet. The system 100 may be implemented using a private intranet. Elements of the system 100, such as the database 108 and/or the data server 110, may be physically housed at a location remote from an entity that owns and/or operates the system 100. For example, various elements of the system 100 may be physically housed at a public service provider such as a web services provider. Elements of the system 100 may be physically housed at a private location, such as at a location occupied by the entity that owns and/or operates the system 100.

The communication links 120 may be direct or indirect. A direct link may include a link between two devices where information is communicated from one device to the other without passing through an intermediary. For example, the direct link may include a Bluetooth™ connection, a Zigbee® connection, a Wi-fi Direct™ connection, a near-field communications (NFC) connection, an infrared connection, a wired universal serial bus (USB) connection, an ethernet cable connection, a fiber-optic connection, a firewire connection, a microwire connection, and so forth. In another example, the direct link may include a cable on a bus network. "Direct," when used regarding the communication links 120, may refer to any of the aforementioned direct communication links.

An indirect link may include a link between two or more devices where data may pass through an intermediary, such as a router, before being received by an intended recipient of the data. For example, the indirect link may include a Wi-Fi connection where data is passed through a WiFi router, a cellular network connection where data is passed through a cellular network router, a wired network connection where devices are interconnected through hubs and/or routers, and so forth. The cellular network connection may be implemented according to one or more cellular network standards, including the global system for mobile communications (GSM) standard, a code division multiple access (CDMA) standard such as the universal mobile telecommunications standard, an orthogonal frequency division multiple access (OFDMA) standard such as the long term evolution (LTE) standard, and so forth. "Indirect," when used regarding the communication links 120, may refer to any of the aforementioned indirect communication links.

Figure 2:
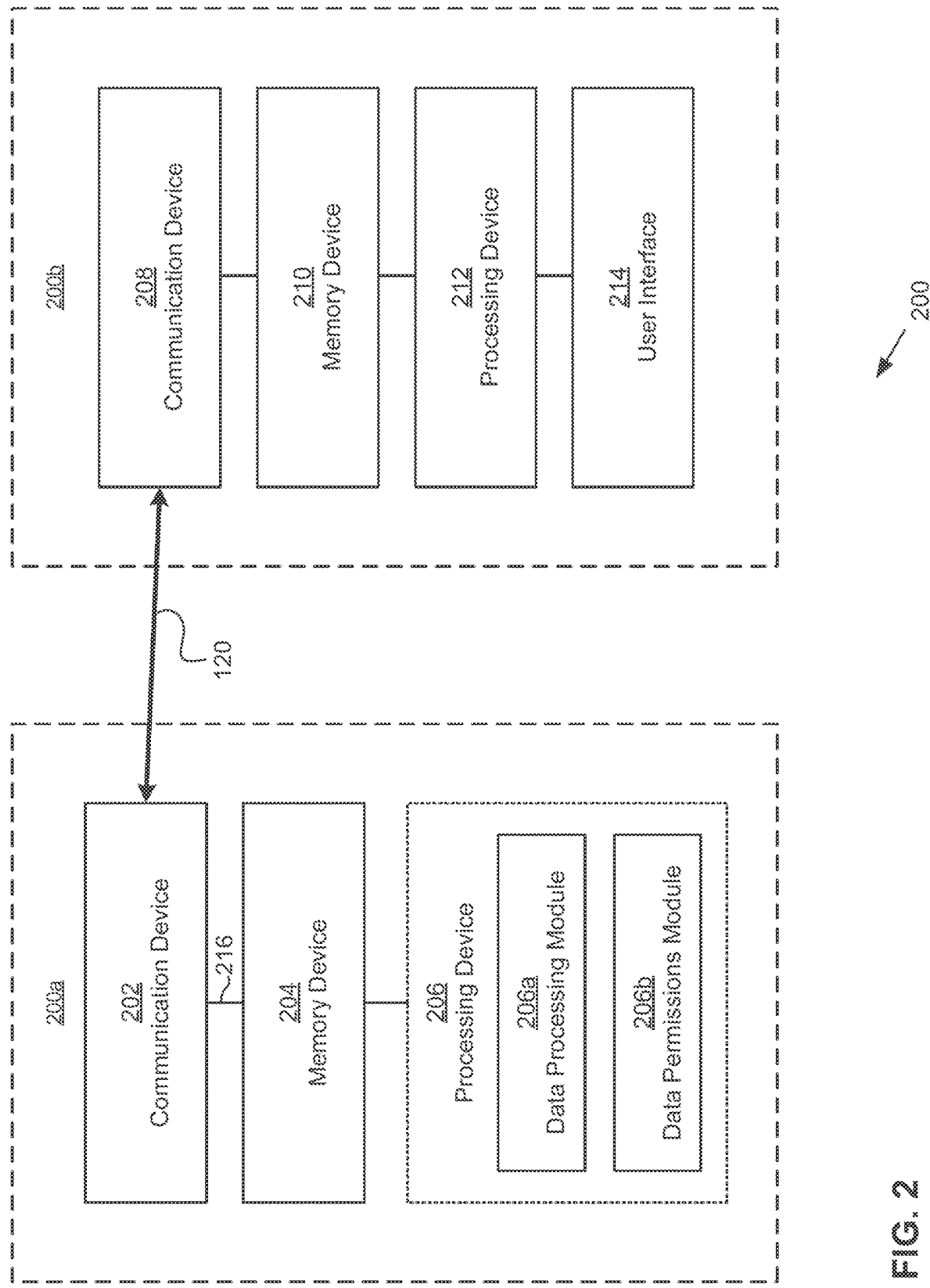
FIG. 2 illustrates a device schematic for various devices used in the autonomous, artificially intelligent, and fully distributed Wi-Fi system, according to an embodiment.

FIG. 2 illustrates a device schematic 200 for various devices used in the system 100, according to an embodiment. A server device 200a may moderate data communicated to a client device 200b based on data permissions to minimize memory resource allocation at the client device 200b.

The server device 200a may include a communication device 202, a memory device 204, and a processing device 206. The processing device 206 may include a data processing module 206a and a data permissions module 206b, where module refers to specific programming that governs how data is handled by the processing device 206. The client device 200b may include a communication device 208, a memory device 210, a processing device 212, and a user interface 214. Various hardware elements within the server device 200a and/or the client device 200b may be interconnected via a system bus 216. The system bus 216 may be and/or include a control bus, a data bus, and address bus, and so forth. The communication device 202 of the server device 200a may communicate with the communication device 208 of the client device 200b.

The data processing module 206a may handle inputs from the client device 200a. The data processing module 206a may cause data to be written and stored in the memory device 204 based on the inputs from the client device 200b. The data processing module 206a may receive data stored in the memory device 204 and output the data to the client device 200a via the communication device 202. The data permissions module 206b may determine, based on permissions data stored in the memory device, what data to output to the client device 200b and what format to output the data in (e.g., as a static variable, as a dynamic variable, and so forth). For example, a variable that is disabled for a particular user profile may be output as static. When the variable is enabled for the particular user profile, the variable may be output as dynamic.

The server device 200a may be representative of the cloud-based data management system 102. The server device 200a may be representative of the application server 106. The server device 200a may be representative of the data server 110. The server device 200a may be representative of the external application server 116. The memory device 204 may be representative of the database 108 and the processing device 206 may be representative of the data server 110. The memory device 204 may be representative of the external database 118 and the processing device 206 may be representative of the external application server 116. For example, the database 108 and/or the external database 118 may be implemented as a block of memory in the memory device 204. The memory device 204 may further store instructions that, when executed by the processing device 206, perform various functions with the data stored in the database 108 and/or the external database 118.

Similarly, the client device 200b may be representative of the user device 104. The client device 200b may be representative of the smartphone 112. The client device 200b may be representative of the personal computer 114. The memory device 210 may store application instructions that, when executed by the processing device 212, cause the client device 200b to perform various functions associated with the instructions, such as retrieving data, processing data, receiving input, processing input, transmitting data, and so forth.

As stated above, the server device 200a and the client device 200b may be representative of various devices of the system 100. Various of the elements of the system 100 may include data storage and/or processing capabilities. Such capabilities may be rendered by various electronics for processing and/or storing electronic signals. One or more of the devices in the system 100 may include a processing device. For example, the cloud-based data management system 102, the user device 104, the smartphone 112, the personal computer 114, the external application server 116, and/or the external database 118 may include a processing device. One or more of the devices in the system 100 may include a memory device. For example, the cloud-based data management system 102, the user device 104, the smartphone 112, the personal computer 114, the external application server 116, and/or the external database 118 may include the memory device.

The processing device may have volatile and/or persistent memory. The memory device may have volatile and/or persistent memory. The processing device may have volatile memory and the memory device may have persistent memory. Memory in the processing device may be allocated dynamically according to variables, variable states, static objects, and permissions associated with objects and variables in the system 100. Such memory allocation may be based on instructions stored in the memory device. Memory resources at a specific device may be conserved relative to other systems that do not associate variables and other object with permission data for the specific device.

The processing device may generate an output based on an input. For example, the processing device may receive an electronic and/or digital signal. The processing device may read the signal and perform one or more tasks with the signal, such as performing various functions with data in response to input received by the processing device. The processing device may read from the memory device information needed to perform the functions. For example, the processing device may update a variable from static to dynamic based on a received input and a rule stored as data on the memory device. The processing device may send an output signal to the memory device, and the memory device may store data according to the signal output by the processing device.

The processing device may be and/or include a processor, a microprocessor, a computer processing unit (CPU), a graphics processing unit (GPU), a neural processing unit, a physics processing unit, a digital signal processor, an image signal processor, a synergistic processing element, a field-programmable gate array (FPGA), a sound chip, a multi-core processor, and so forth. As used herein, "processor," "processing component," "processing device," and/or "processing unit" may be used generically to refer to any or all of the aforementioned specific devices, elements, and/or features of the processing device.

The memory device may be and/or include a computer processing unit register, a cache memory, a magnetic disk, an optical disk, a solid-state drive, and so forth. The memory device may be configured with random access memory (RAM), read-only memory (ROM), static RAM, dynamic RAM, masked ROM, programmable ROM, erasable and programmable ROM, electrically erasable and programmable ROM, and so forth. As used herein, "memory," "memory component," "memory device," and/or "memory unit" may be used generically to refer to any or all of the aforementioned specific devices, elements, and/or features of the memory device.

Various of the devices in the system 100 may include data communication capabilities. Such capabilities may be rendered by various electronics for transmitting and/or receiving electronic and/or electromagnetic signals. One or more of the devices in the system 100 may include a communication device, e.g., the communication device 202 and/or the communication device 208. For example, the cloud-based data management system 102, the user device 104, the smartphone 112, the personal computer 114, the application server 116, and/or the external database 118 may include a communication device.

The communication device may include, for example, a networking chip, one or more antennas, and/or one or more communication ports. The communication device may generate radio frequency (RF) signals and transmit the RF signals via one or more of the antennas. The communication device may receive and/or translate the RF signals. The communication device may transceive the RF signals. The RF signals may be broadcast and/or received by the antennas.

The communication device may generate electronic signals and transmit the RF signals via one or more of the communication ports. The communication device may receive the RF signals from one or more of the communication ports. The electronic signals may be transmitted to and/or from a communication hardline by the communication ports. The communication device may generate optical signals and transmit the optical signals to one or more of the communication ports. The communication device may receive the optical signals and/or may generate one or more digital signals based on the optical signals. The optical signals may be transmitted to and/or received from a communication hardline by the communication port, and/or the optical signals may be transmitted and/or received across open space by the networking device.

The communication device may include hardware and/or software for generating and communicating signals over a direct and/or indirect network communication link. For example, the communication component may include a USB port and a USB wire, and/or an RF antenna with Bluetooth™ programming installed on a processor, such as the processing component, coupled to the antenna. In another example, the communication component may include an RF antenna and programming installed on a processor, such as the processing device, for communicating over a Wi-fi and/or cellular network. As used herein, "communication device" "communication component," and/or "communication unit" may be used generically herein to refer to any or all of the aforementioned elements and/or features of the communication component.

Various of the elements in the system 100 may be referred to as a "server." Such elements may include a server device. The server device may include a physical server and/or a virtual server. For example, the server device may include one or more bare-metal servers. The bare-metal servers may be single-tenant servers or multiple tenant servers. In another example, the server device may include a bare metal server partitioned into two or more virtual servers. The virtual servers may include separate operating systems and/or applications from each other. In yet another example, the server device may include a virtual server distributed on a cluster of networked physical servers. The virtual servers may include an operating system and/or one or more applications installed on the virtual server and distributed across the cluster of networked physical servers. In yet another example, the server device may include more than one virtual server distributed across a cluster of networked physical servers.

The term server may refer to functionality of a device and/or an application operating on a device. For example, an application server may be programming instantiated in an operating system installed on a memory device and run by a processing device. The application server may include instructions for receiving, retrieving, storing, outputting, and/or processing data. A processing server may be programming instantiated in an operating system that receives data, applies rules to data, makes inferences about the data, and so forth. Servers referred to separately herein, such as an application server, a processing server, a collaboration server, a scheduling server, and so forth may be instantiated in the same operating system and/or on the same server device. Separate servers may be instantiated in the same application or in different applications.

Various aspects of the systems described herein may be referred to as "data." Data may be used to refer generically to modes of storing and/or conveying information. Accordingly, data may refer to textual entries in a table of a database. Data may refer to alphanumeric characters stored in a database. Data may refer to machine-readable code. Data may refer to images. Data may refer to audio. Data may refer to, more broadly, a sequence of one or more symbols.

The symbols may be binary. Data may refer to a machine state that is computer-readable. Data may refer to human-readable text.

Various of the devices in the system 100, including the server device 200a and/or the client device 200b, may include a user interface for outputting information in a format perceptible by a user and receiving input from the user, e.g., the user interface 214. The user interface may include a display screen such as a light-emitting diode (LED) display, an organic LED (OLED) display, an active-matrix OLED (AMOLED) display, a liquid crystal display (LCD), a thin-film transistor (TFT) LCD, a plasma display, a quantum dot (QLED) display, and so forth. The user interface may include an acoustic element such as a speaker, a microphone, and so forth. The user interface may include a button, a switch, a keyboard, a touch-sensitive surface, a touchscreen, a camera, a fingerprint scanner, and so forth. The touchscreen may include a resistive touchscreen, a capacitive touchscreen, and so forth.

Various methods are described below. The methods may be implemented by the system 100 and/or various elements of the system described above. For example, inputs indicated as being received in a method may be input at the client device 200b and/or received at the server device 200a. Determinations made in the methods may be outputs generated by the processing device 206 based on inputs stored in the memory device 204. Correlations performed in the methods may be executed by the correlation module 206a. Inference outputs may be generated by the inference module 206b. Key data and/or actionable data may be stored in the knowledge database 204b. Correlations between key data and actionable data may be stored in the knowledge database 204b. Outputs generated in the methods may be output to the output database 204c and/or the client device 200b. In general, data described in the methods may be stored and/or processed by various elements of the system 100.

Figure 3:
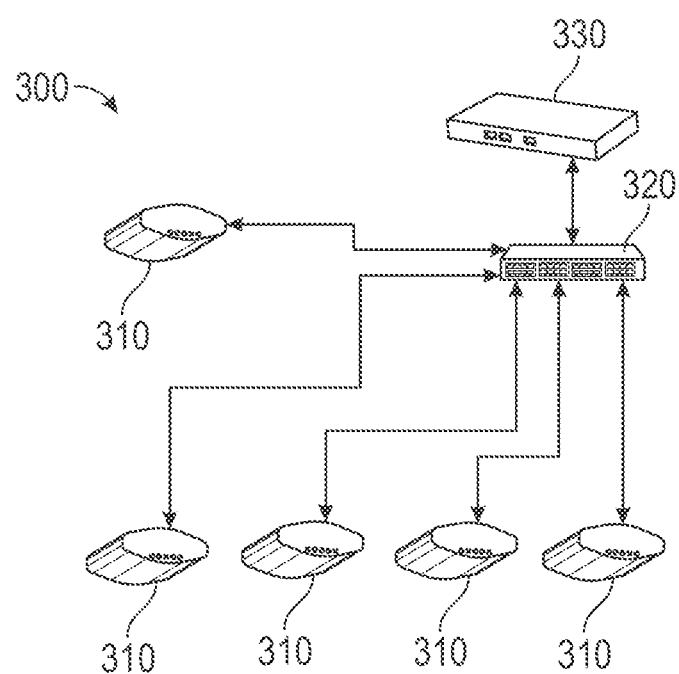
FIG. 3 illustrates a prior art Wi-Fi system, according to an embodiment.

FIG. 3 illustrates a prior art enterprise Wi-Fi network. As illustrated in FIG. 3 the prior art enterprise Wi-Fi system 300 includes standard access points 310, a network switch 320 and a controller 330. The standard access points 310 are connected to the network switch 320 via ethernet cables and the network switch 320 is controlled by a controller 330 that contains a processing device. The processing device on the controller 330 is responsible for the functioning of the prior art Wi-Fi system 300 and can be a single point of failure for the entire system.

Figure 4:
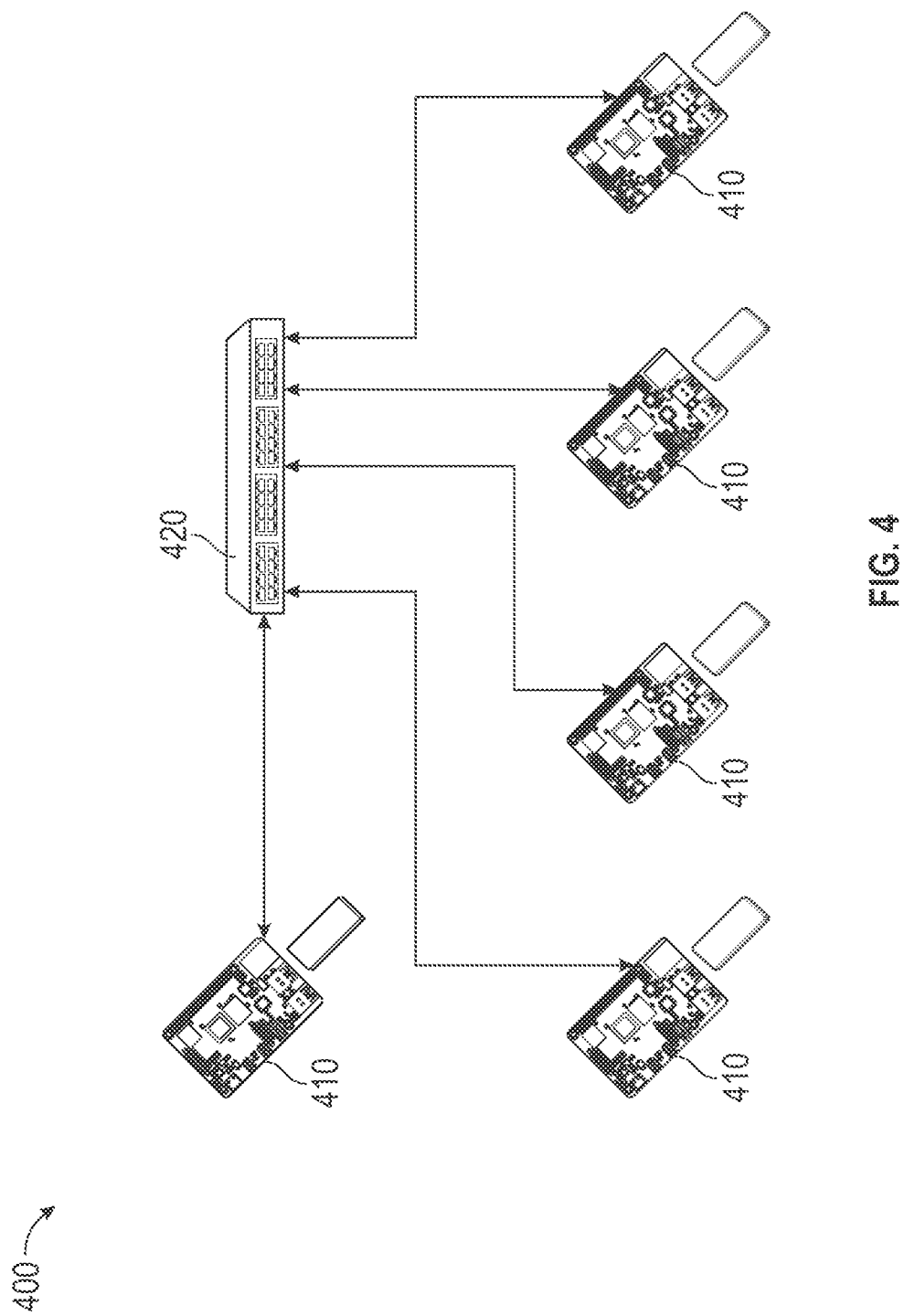
FIG. 4 illustrates the autonomous, artificially intelligent, and fully distributed Wi-Fi system, according to an embodiment.

FIG. 4 illustrates an autonomous, artificially intelligent, and fully distributed Wi-Fi system 400, according to an embodiment. The system 400 includes nodes 410 in which each node 410 includes an SBC that further includes at least two Wi-Fi radios, a processing device and a memory device. The nodes 410 are connected to the network switch 420, which provides hard wired internet traffic transmissions and power for the nodes. The nodes 410 are configured to run a software module or software modules that provide the distributed Wi-Fi system.

The system 400 uses the CPU power in low-cost SBCs, for example a Raspberry Pi 4 Model B SBC, to provide a decentralized distributed computing system that intelligently performs global radio resource management. Embodiments of the system 400 can include SBCs that are configured to support multiple Wi-Fi radios. As an example, the Raspberry Pi SBC can support multiple radios to supply continuous sensor data to feed the radio resource management mechanism with continuous feedback. The use of a distributed system removes the need for a centralized controller.

The SBC includes a processor device that can execute software modules that control the system 400. Embodiments of the system 400 can include four software modules: (1) a sensor module that performs continuous site surveys; (2) an accumulator module that inspects sensor data to determine what networks are in the coverage area; (3) a solver module that implements the channel selection algorithm to determine channel configurations; and (4) a configuration generator module that that assigns channels to each access point.

In an embodiment. SBC, such as Raspberry Pi can be installed with an operating system, such as the Kali distribution of the Linux operating system. The system can be installed with other operating systems, including, but not limited to iOS, Android, IOS (Cisco), Window. The Kali Linux distribution includes open-source sensor packages that are generally used for penetration testing. The Kali Linux distribution software can be used to perform wireless site surveys. Kali Linux distribution includes hostapd open-source software wireless package. Hostapd can be configured to enable Linux computers to function as wireless access points.

The software modules can be written in Python 3.8, or any suitable language, and installed on the SBCs. Other software languages, as well as alternative SBC can be employed by the system 400. In an embodiment the SBC nodes executes four software modules that in combination result in a fully autonomous, artificially intelligent Wi-Fi system that can continuously perform radio resource management based on real-time sensor feedback.

The first software module is a sensor module, also known as a sensing platform that performs a continuous wireless site survey. In an embodiment, the survey is geospatially localized to the area immediately around the SBC, which contains the integrated sensing Wi-Fi radio that is used as the sensor. The result of the scan is a list of detected Wi-Fi networks and associated metadata. The scan result can be stored in a parsed_cells data structure that can be formatted in JavaScript Object Notation (JSON), which can be easily serialized and broadcast. An example of the format of the parsed_cells data structure follows:

[{name, quality, channel, frequency, encryption,
address, signal level, bit rates, origin node}, . . . ]

The sensor data in the scan can represent a Wi-Fi network detected by the integrated sensing Wi-Fi radio. The metadata contains the channel number (or frequency) that the Wi-Fi network is operating on. The senor data can also contain the media access control (MAC) address (or hardware address) of the node that detected the Wi-Fi network to enable the system to disallow the channel for only the node that detected the Wi-Fi network to prevent co-channel interference. An example of an instance of the parsed_cells data structure follows:

{"data": [{"Name": "Guest",
"Quality": "90"
"Channel": "1",
"Frequency": "2.412",
"Encryption": "WPA2",
"Address": "aa:00:bb:11:cc:22",
"Signal Level": "−46",
"Bit Rates": "1 Mb/s; 2 Mb/s; 5.5 Mb/s; 11 Mb/s; 18 Mb/s",
"origin_node": "bb:11:cc:22:dd:33"}, . . . ]}

Once the scan has been completed and the data has been processed, the resulting serialized dataset is shared with all nodes via User Datagram Protocol (UDP) broadcast.

The second software module is an accumulator module, also known as a discriminating accumulator that inspects all UDP broadcast packets received from other nodes. The accumulator module maintains at least two local data structures: access_points and banned_channels. UDP broadcast data is inspected for a payload field that contains the Wi-Fi network name, which determines if the data will be sorted into access_points or banned_channels. If the Wi-Fi network name matches the local network name (a node in the system), then the detected Wi-Fi network must be a node of the system that is visible to the sensing node. A purpose of the access_points data structure can be to store a radiofrequency adjacency map of all the access points.

The accumulator module can identify Wi-Fi hardware addresses that are stored in the memory device as network Wi-Fi addresses via the processing device, and the accumulator module can store identified network Wi-Fi addresses under access points. The accumulator module can identifies Wi-Fi hardware addresses that are not stored in the memory device as co-channel interference Wi-Fi addresses via the processing device. The accumulator module can store identified co-channel interference Wi-Fi addresses under banned channels.

The radiofrequency adjacency map can be used by a graph coloring algorithm, or other algorithms to generate a configuration for the access points. The radiofrequency adjacency map can also be used to count the total number of nodes in the network. A first data structure can be in the following format:
{
AP: neighbors,
AP 2: neighbors,
AP 3: neighbors, . . .
}
An example of an instance of the access_points data structure follows:
{
"aa:00:bb:11:cc:22": {
"bb:11:cc:22:dd:33",
"cc:22:dd:33:ee:44"
},
"bb:11:cc:22:dd:33": {
"aa:00:bb:11:cc:22"
},
"cc:22:dd:33:ee:44": {
"aa:00:bb:11:cc:22"
}
}
If the Wi-Fi network name does not match the local network name, then the network is a source of external co-channel interference and the channel used by that network should be avoided. The memory device associated with the system is configured to store a list of all access points used by the system. The access points can be identified by the stored Wi-Fi frequencies, Wi-Fi frequency data, or network names associated with Wi-Fi hardware addresses or Wi-Fi hardware data for each node. The banned_channels data structure can be used to store a list of channels that each node in the system should avoid. The list of banned channels can be used by a graph coloring algorithm to prevent external co-channel interference. An example of a format for a banned_channels data structure follows:
{
AP: banned channels,
AP 2: banned channels,
AP 3: banned channels, . . .
}

An example of an instance of the banned_channels data structure follows:
{"aa:00:bb:11:cc:22": {
"banned 2.4": [
1, 2, 3
],
"banned 5": [
36
]
}, . . .
}
The third software module is a solver module that can implement the channel selection algorithm that is required for the system to deliver radio resource management. Radiofrequency adjacency and interference information gathered by the accumulator modules can be broadcast to and considered by the solver modules on each and every node. This architecture enables the system 700 to be fully distributed and obviates the need for a centralized controller, such as the ones found in enterprise Wi-Fi systems.

The solver module can implement a graph coloring algorithm to determine which nodes should be assigned to which channels (or frequencies) based on their visibility to other access points and other networks in the area. When the map of node radiofrequency adjacencies or the list of unavailable channels changes, channel assignments can be redetermined utilizing a graph coloring algorithm.

The fourth module is configuration generator module that provides automated configurations for a configuration file. The configuration file, which in the current examples can be named hostapd.conf, specifies the parameters that define the Open Systems interconnection (OSI) model physical and data link layer operations of the node. The hostapd.conf file is usually manually written by network administrators with radio channel configuration determined by the results of a wireless site survey. The system differs by automatically creating the hostapd.conf file based on data supplied by the solver module. The system automatically performs global radio resource management (RRM) by automatically determining a channel configuration that minimizes co-channel interference to improve and/or maximize network performance. A sample of an automatically generated hostapd.conf follows:
   bridge=br0
   country_code=US
   interface=wlan0
   driver=nl80211
   ht_capab=[HT40][SHORT-GI-20][DSSS_CCK-40]
   ssid=Guest
   hw_mode=a
   channel=40
   ignore_broadcast_ssid=0
   macaddr_acl=0
   wmm_enabled=1
   wpa=2
   wpa_passphrase=GuestInternet
   auth_algs=1
   wpa_key_mgmt=WPA-PSK
   wpa_pairwise=CCMP
   rsn_pairwise=CCMP
In the example hostapd.conf file, the node is instructed to use the Institute of Electrical and Electronics Engineers (IEEE) Wi-Fi standard 802.11a on channel 40. The node will utilize the nl80211 driver to communicate with the first wireless network interface card, which is identified as wlan0. The node is instructed to utilize the WPA2-PSK security algorithm and CCMP encryption mode. In this example, the Wi-Fi SSID name is "Guest", and the passphrase is "GuestInternet." These parameters are customizable to fit different deployment scenarios.

The vertices in the graph coloring algorithm represent nodes and the various colors represent different channels. The edges are lines that connect two vertices to represent that two nodes are visible to each other. The graph coloring algorithm utilizes a greedy approach that considers the vertices from least available colors to most and from most uncolored neighbors to least, in that order. The vertex with the least number of possible selections is considered first because it is more likely to cause a conflict with an adjacent node. The vertex with the most uncolored neighbors is considered next because the selection of a color will affect the most number of nodes. The algorithm makes the locally optimal choice at each vertex, following the heuristic of choosing the first valid channel in the list of possible channels. Given that graph coloring is an NP-hard problem, it is difficult to find an optimal solution quickly (i.e. in polynomial time). A greedy algorithm can be used because it will terminate quickly and any solution produced by the algorithm can also be verified quickly, even if the solution is not the optimal solution. To ensure parity of solutions between all nodes, a voting system can be utilized to ensure that a majority of the nodes agree with the identified solution or matching Wi-Fi configuration. In the voting system, every node broadcasts the solution it has found after the solution is verified to be a valid graph coloring. Nodes wait until approximately 50%, greater than 50%, or 50% of all known nodes have broadcast the same solution before rewriting the channel parameter in the hostapd configuration file and restarting hostapd to apply the correct channel. If a different solution is received, the node catalogs the solution and notes the number of nodes that agree with the other solution. If the percentage of nodes that agree with the alternate solution exceeds 50% of all nodes, then the node utilizes the alternate solution when applying the changes to the hostapd configuration. If a majority is not reached before a new solution is determined, then the hostapd configuration will remain unchanged and the voting process will repeat. The autonomous system continuously performs site surveys and determines new solutions.

Figure 5:
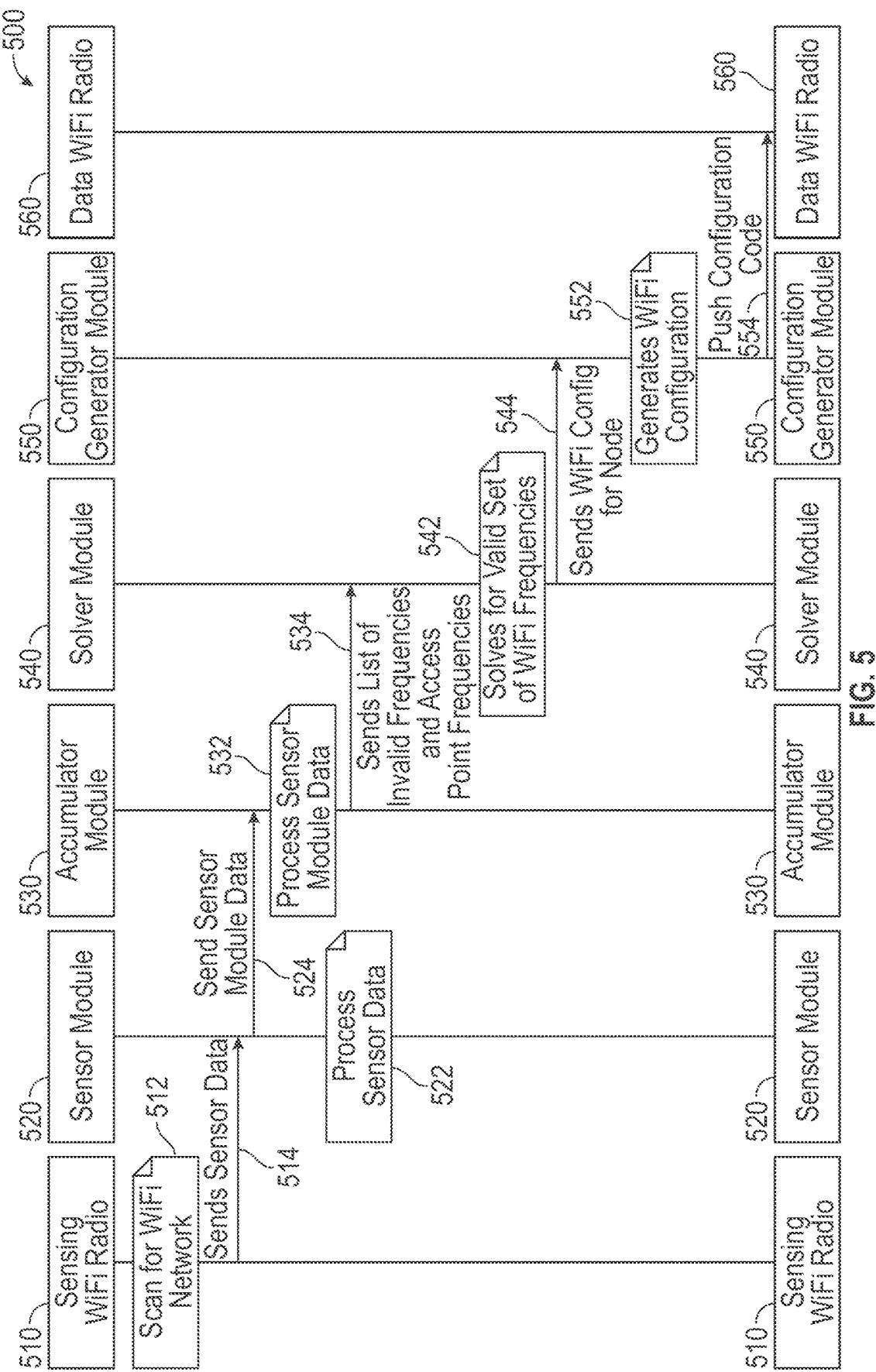
FIG. 5 illustrates a flow chart for an autonomous, artificially intelligent, and fully distributed Wi-Fi system, according to an embodiment.

FIG. 5 illustrates a flow chart for an autonomous, artificially intelligent, and fully distributed Wi-Fi system 500, according to an embodiment. The system 500 illustrated in FIG. 5 includes a sensing Wi-Fi radio 510, a sensor module 520, an accumulator module 530, a solver module 540, a configuration generator module 550, and a data Wi-Fi radio 560.

Embodiments of the sensing Wi-Fi radio 510 can be incorporated into an SBC and/or be stand alone device. The sensing Wi-Fi radio 510 is one part of the nodes 410 discussed above in FIG. 4. The sensing Wi-Fi radio 510 is configured to scan for and detect Wi-Fi signals in a coverage area. The processing device on the SBC can execute various software modules to assist the system 500 in the creation and maintenance of the system 500.

Embodiments of the sensor module 520 provide continuous site surveys. The senor module 520 can be configured to review the Wi-Fi signals in the coverage area of sensing Wi-Fi radio (which is part of node 410) and record the frequency of the detected Wi-Fi signals. The sensor module 520 can assign MAC addresses to Wi-Fi signals to identify the source of the Wi-Fi signal. The sensor module 520 can assign MAC addresses from Wi-Fi sources that provide a Wi-Fi probe packet that includes the identifying MAC address or other hardware address, such as Wi-Fi hardware addresses, and Wi-Fi metadata.

Embodiments of the accumulator module 530 inspect sensor data to determine what networks are in the coverage area. The accumulator module 530 analyzes and records the senor data provided by the sensor module 520. The accumulator module 530 processes data via a processing device, and records the data via a memory device.

Embodiments of the solver module 540 implement a channel selection algorithm to determine channel configurations. The solver module 540 analyzes the list of Wi-Fi frequencies that are being used by Wi-Fi devices in the coverage area and determine a list of used and un-used Wi-Fi frequencies that can be efficiently used by the data Wi-Fi radio 560. Wi-Fi devices can include networks emitting Wi-Fi signals and/or other devices operating on Wi-Fi signals. The solver module 540 can use an algorithm, such as a graph coloring algorithm, to generate a list of available Wi-Fi frequencies (a configuration) to be used by the data Wi-Fi radios 560.

Embodiments of the configuration generator module 550 are configured to assigns un-used Wi-Fi channels to the data Wi-Fi radios 560. The configuration generator module 550 can write and/or re-write the code that directs which Wi-Fi frequency the data Wi-Fi radios 560 use.

As illustrated in FIG. 5 the sensing Wi-Fi radio 510 executes a scan for Wi-Fi networks step 512 in which the sensing Wi-Fi radio 510 scans the coverage area to detect Wi-Fi signals from nodes on the network and Wi-Fi signals that are not a part of the network. Next, the sensing Wi-Fi radio 510 executes a send sensor data step 514, in which the sensor data is sent to the sensor module 520. The sensor module 520 analyzes the sensor data in a processing sensor data step 522 via a processing device and sends processed sensor data from the sensor module 520 to the accumulator module 530 in a forward sensor module data step 524.

The accumulator module 530 receives the sensor module data and compiles and/or processes the sensor module data in a process sensor module data step 532. The accumulator module 530 processes the sensor module data via a processing device and produces a list of invalid Wi-Fi frequencies/banned frequencies/banned channels, and a list of access points (or Wi-Fi frequencies being used by nodes on the network/system 500). The invalid Wi-Fi frequencies are Wi-Fi frequencies that are already being used in the coverage area by Wi-Fi enable devices external to the system 500. The accumulator module 530 executes a send list of invalid frequencies and access point frequencies step 534 in which the accumulator module 530 send a list of invalid frequencies and access point frequencies to the solver module 540.

The solver module 540 executes a solve for valid set of Wi-Fi frequency step 542 in which the solver module 540 analyzes the list of invalid frequencies and access point frequencies provided by the accumulator module 530 and prepares a list of valid Wi-Fi frequencies based on the standard available Wi-Fi frequencies that are recorded on a memory device accessible by the solver module 540. Next, the solver module 540 executes a send Wi-Fi configuration for the node step 544 in which the solver module 540 forwards a Wi-Fi configuration to the configuration generator module 550.

The configuration generator module 550 analyzes the Wi-Fi configuration sent by the solver module 540 in a generate Wi-Fi configuration code step 552. The Wi-Fi configuration code can be read and executed by the data Wi-Fi radio 560. Next the configuration generator module 550 forwards the Wi-Fi configuration code to the data Wi-Fi radio in a forward Wi-Fi configuration code step 554.

The data Wi-Fi radio 560 reads and executes the Wi-Fi configuration code via a processing device. The Wi-Fi configuration code provides the radio resource management that efficiently and effectively provides optimal Wi-Fi frequency usage by the system 500.

Figure 6:
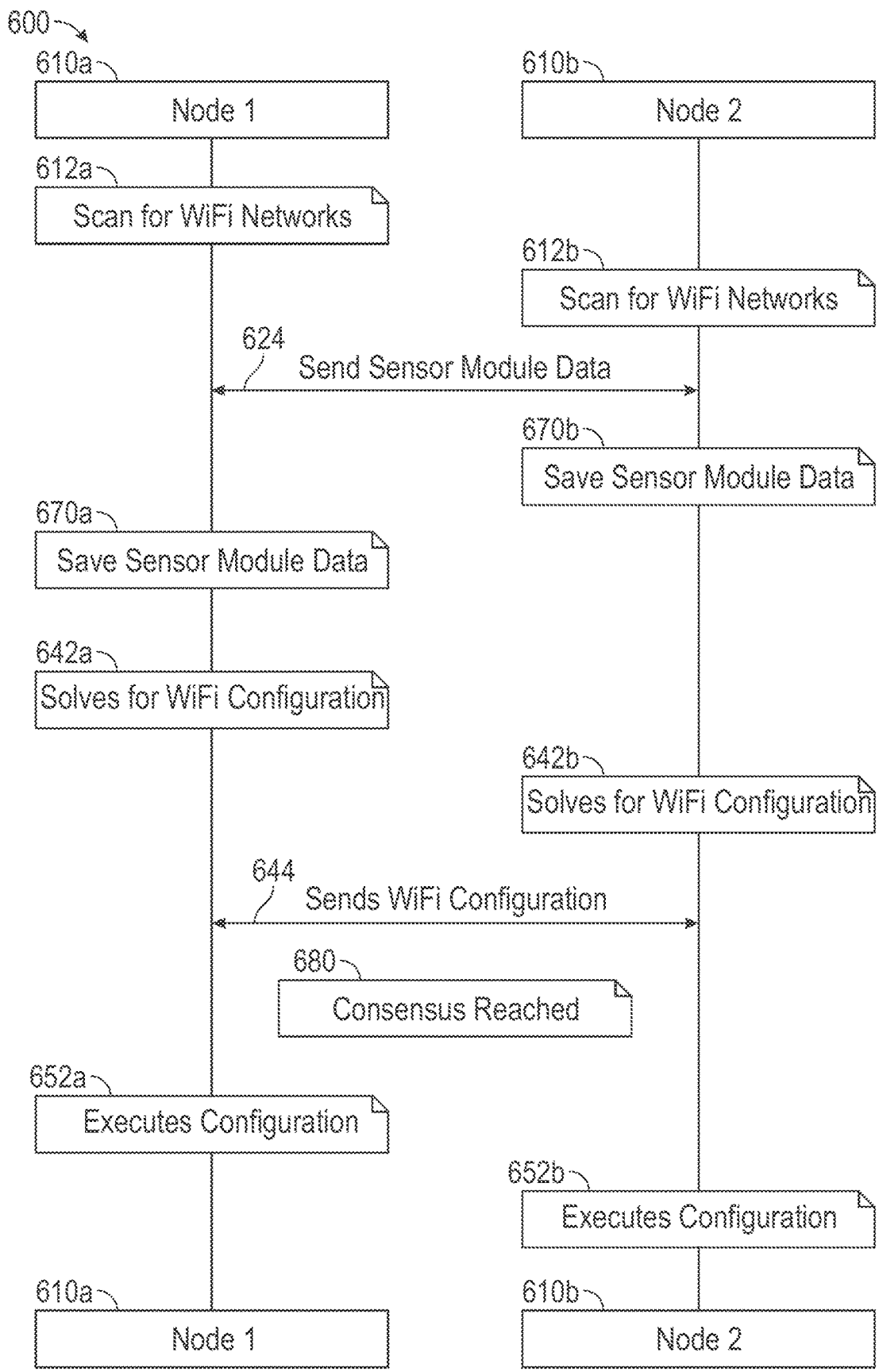
FIG. 6 illustrates a flow chart for an autonomous, artificially intelligent, and fully distributed Wi-Fi system, according to an embodiment.

FIG. 6 illustrates a flow chart for an autonomous, artificially intelligent, and fully distributed Wi-Fi system 600, according to an embodiment. FIG. 6 illustrates the interactions between first node 610a and second node 610b in a system 600. The nodes 610a, 610b include a sensing Wi-Fi radio 510, a data Wi-Fi radio 560, sensor module 520, accumulator module 530, solver module 540 and configuration generator module 550 discussed above. As illustrated in FIG. 6 the first node 610 scans for and/or detects Wi-Fi signals via scan for Wi-Fi networks step 612a, executes a send sensor data step 614a (not shown) to sensor module 520a, and executes a forward sensor module data step 622a. The forward sensor module data step 622a can send the sensor module data to the accumulator module 530a on the first node 610a, and to the accumulator module 530b on the second node 610b. The second node 610b detects Wi-Fi signals via scan for Wi-Fi networks step 612b, executes a send sensor step 614b (not shown) to sensor module 520b, and executes a forward sensor module data step 622b. The forward sensor module data step 622b can send the sensor module data to the accumulator module 530b on the second node 610b, and to the accumulator module 530a on the first node 610a.

The first node 610a and the second node 610b record and save the sensor module data on a memory device associated with the nodes in save sensor module data step 670a, 670b. As described in FIG. 5, the accumulator module 530a, 530b process the sensor module data and sends it to the solver modules 540a, 540b as a list of invalid frequencies and a list of access points in step 534. Next, the solver modules 540a, 540b processes the list of invalid frequencies and a list of access points in step 642a. 642b to generate Wi-Fi configuration for each node. The first node 610a sends the Wi-Fi configuration for the first node to the second node 610b, and the second node sends the Wi-Fi configuration for the second node to the first node 610a. The Wi-Fi configurations are sent via a send Wi-Fi configuration for the node step 644a, 644b to the configuration generator module 650a, 650b.

Next, the system 600 reaches: (1) a consensus reached step 680; or (2) a no consensus reached step 690. A consensus reached step 680 is reached if the Wi-Fi configuration for the first node 610a and the Wi-Fi configuration for the second node 610b match or indicate the same Wi-Fi frequency. If a consensus is reached, a generate Wi-Fi configuration code step 652a, 652b is executed by configuration generator module 650a, 650b and a new code is created by the configuration generator module 550a, 550b for data Wi-Fi radio 560a, 560b. If no consensus is reached, the existing Wi-Fi configuration code for first and second node 610a, 610b, is maintained until a consensus is reached.

Figure 7:
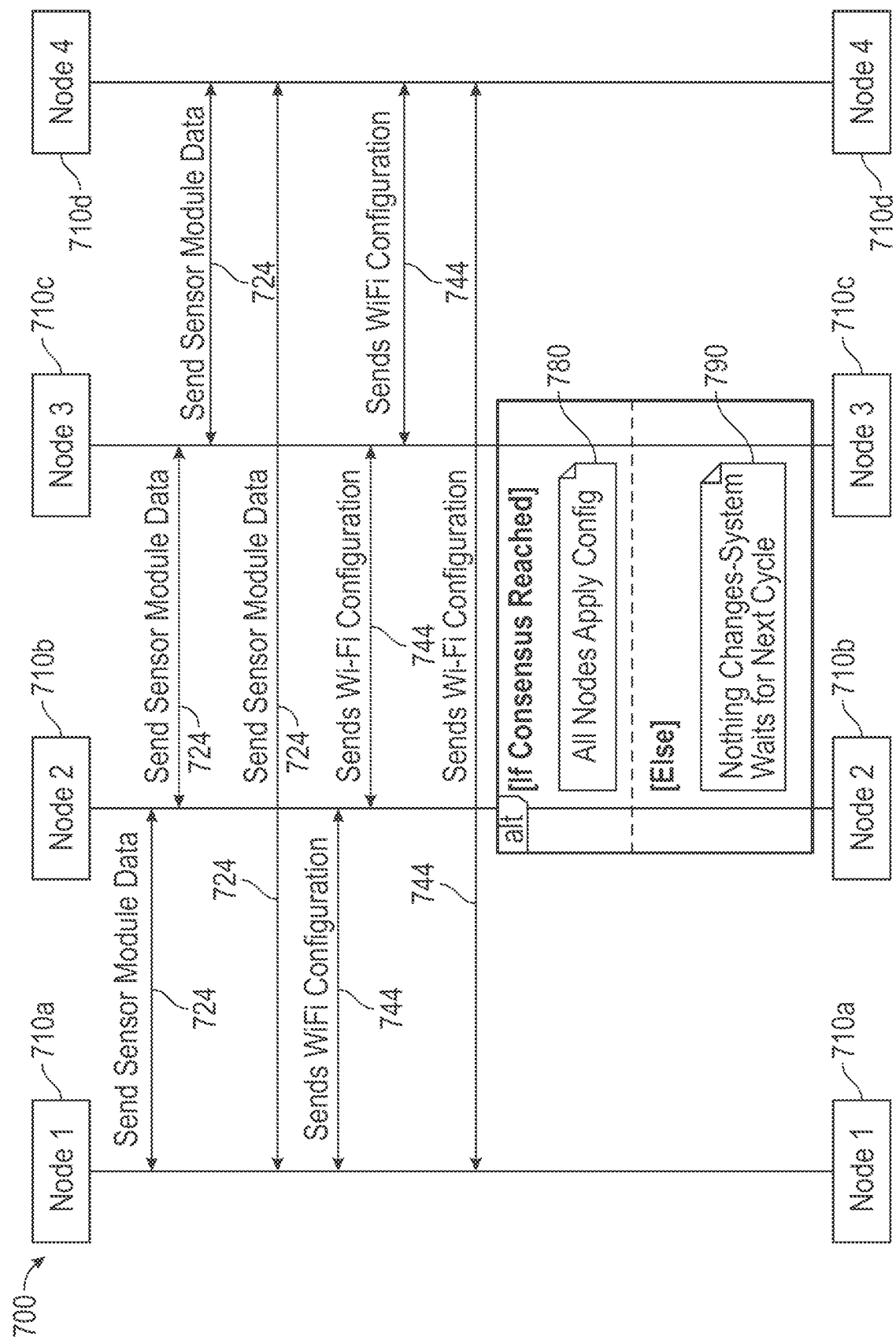
FIG. 7 illustrates a flow chart for an autonomous, artificially intelligent, and fully distributed Wi-Fi system, according to an embodiment.

FIG. 7 illustrates a flow chart for an autonomous, artificially intelligent, and fully distributed Wi-Fi system 700, according to an embodiment. FIG. 7 illustrates the interactions between first node 710a, second node 710b, third node 710c, and fourth node 710d in a system 700. The total number of nodes is not limited, additional nodes can be added to the system 700 based on the size of the desired Wi-Fi network. Similar to the steps discussed in FIGS. 5 and 6 above, the system 700 detects or senses Wi-Fi signals via sensor Wi-Fi radios 510a, 510b, 510c, 510d and generates senor data. The system 700 processes the sensor data via senor modules 520a, 520b, 520c, and 520d to generate senor module data. The senor modules 520a, 520b, 520c, and 520d send the senor module data to the accumulator modules 530a, 530b, 530c, 530d. As illustrated in FIG. 7, the system 700 sends the sensor module data from each node to all of the nodes in the system 700 via send sensor module data step 722. Further, each node processes the sensor module data and solves for Wi-Fi configurations via the solver module 540a, 540b, 540c, 540d. Each node sends the Wi-Fi configuration to every other node in send Wi-Fi configuration for the node steps 744. The Wi-Fi configurations are analyzed by the configuration generator modules 550a, 550b, 550c, 550d and if a consensus is reached by greater than 30%, preferably 40%, and most preferably 50% of the nodes, the configuration generator modules 550a, 550b, 550c, 550d a execute a Wi-Fi configuration code step 752 is executed on each node. The consensus of 50% or greater of the nodes is a network Wi-Fi configuration.

The nodes 710a, 710b 710c. 710d can be located anywhere access points are employed for a Wi-Fi network. Preferably, the nodes 710a. 710b, 710c. 710d are positioned at elevated locations to provide maximum Wi-Fi coverage, with a reduction of attenuation of the signal. Embodiments include nodes 710a. 710b, 710c. 710d located on ceilings, in light fixtures, in molding, or other areas of elevation.

The nodes 710a. 710b, 710c. 710d can be powered by batteries, hard wired into the electric system, powered via PoE (Power over Ethernet) if they are in proximity to a network switch, and/or have optional solar cells, solar power, wind power, or wind powered batteries for primary or back-up power. Preferably, the node can be powered by power over ethernet.

Figure 8:
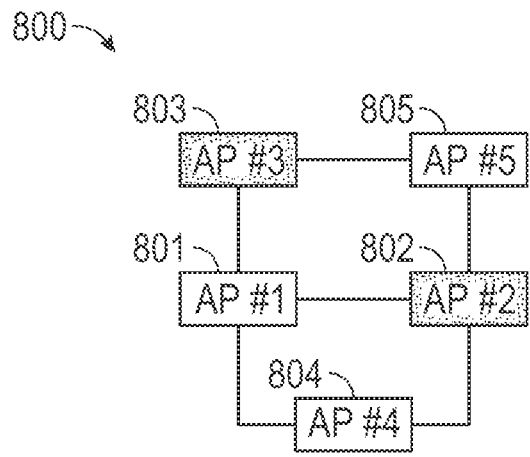
FIG. 8 illustrates a system for an autonomous, artificially intelligent, and fully distributed Wi-Fi system, according to an embodiment.

FIG. 8 illustrates a depiction of a system 800 including five access points AP #1 801, AP #2 802, AP #3 803, AP #4 804 and AP #5 805 without any signal interference. The access points ("AP") can interact with each other and are part of the system 800 for autonomous, artificially intelligent, and fully distributed Wi-Fi infrastructure.

Figure 9:
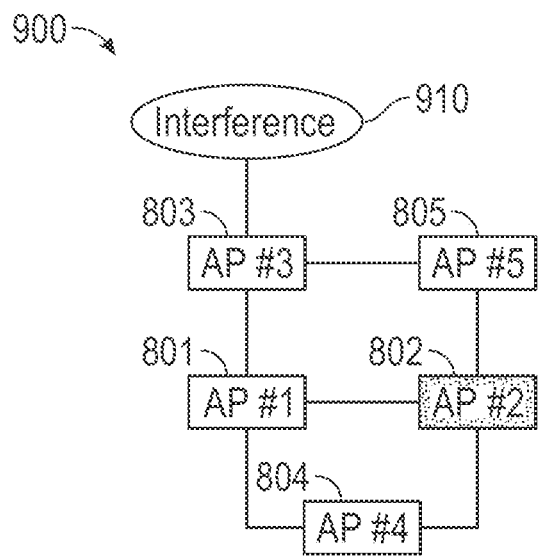
FIG. 9 illustrates a system for an autonomous, artificially intelligent, and fully distributed Wi-Fi system, according to an embodiment.

FIG. 9 illustrates the system 800 of FIG. 8 including interference ("IF") 910. The system 800 is configured to identify the interference 910 and provide Wi-Fi signals for the system 800 that do not interfere with the interference 910. Some of the features in FIG. 9 may be the same as or similar to some of the features in the other FIGs. described herein as noted by same and/or similar reference characters, unless expressly described otherwise. Additionally, reference may be made to features shown in any of the other FIGs. described herein and not shown in FIG. 9.

Figure 10:
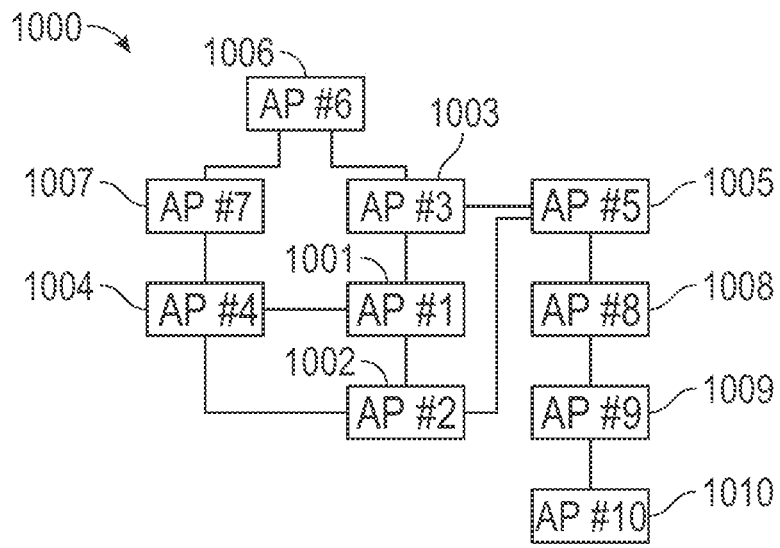
FIG. 10 illustrates a system for an autonomous, artificially intelligent, and fully distributed Wi-Fi system, according to an embodiment.

FIG. 10 illustrates a depiction of a system 1000 including ten access points AP #1 1001, AP #2 1002, AP #3 1003, AP #4 1004, AP #5 1005, AP #6 1006, AP #7 1007, AP #8 1008, AP #9 1009, and AP #10 1010, without any signal interference. The access points ("AP") can interact with each other and are part of the system 1000 for autonomous, artificially intelligent, and fully distributed Wi-Fi infrastructure.

Figure 11:
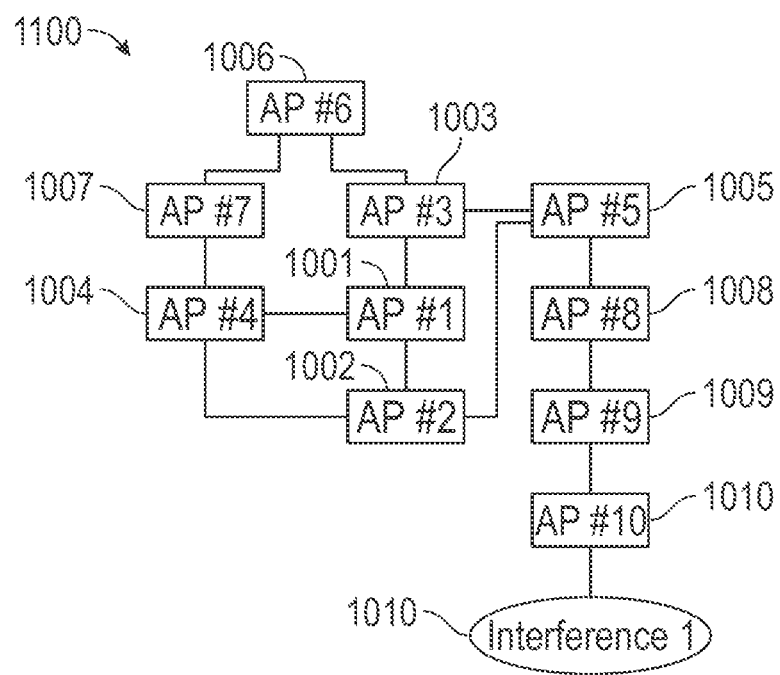
FIG. 11 illustrates a system for an autonomous, artificially intelligent, and fully distributed Wi-Fi system, according to an embodiment.

FIG. 11 illustrates the system 1000 of FIG. 10 including interference ("IF") 1110. The system 10000 is configured to identify the interference 1110 and provide Wi-Fi signals for the system 1000 that do not interfere with the interference 1110. Some of the features in FIG. 11 may be the same as or similar to some of the features in the other FIGs. described herein as noted by same and/or similar reference characters, unless expressly described otherwise. Additionally, reference may be made to features shown in any of the other FIGs. described herein and not shown in FIG. 11.

Figure 12:
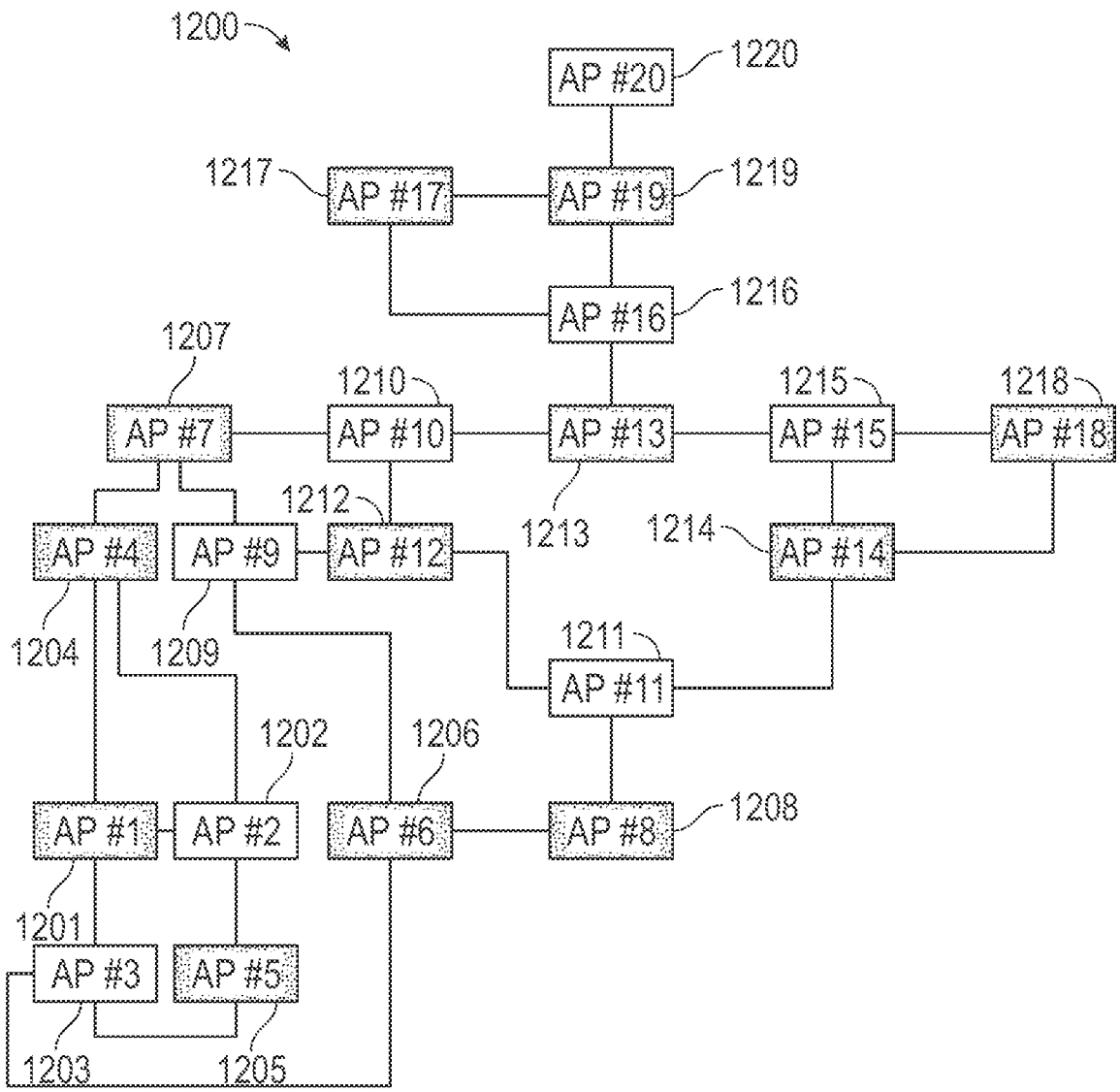
FIG. 12 illustrates a system for an autonomous, artificially intelligent, and fully distributed Wi-Fi system, according to an embodiment.

FIG. 12 illustrates a depiction of a system 1200 including twenty access points AP #1 1201, AP #2 1202, AP #3 1203, AP #4 1204, AP #5 1205, AP #6 1206, AP #7 1207, AP #8 1208, AP #9 1209, AP #10 1210, AP #11 1211, AP #12 1212, AP #13 1213, AP #14 1214, AP #15 1215, AP #16 1216, AP #17 1217, AP #18 1218, AP #19 1219, AP #20 1220 without any signal interference. The access points ("AP") can interact with each other and are part of the system 1200 for autonomous, artificially intelligent, and fully distributed Wi-Fi infrastructure.

Figure 13:
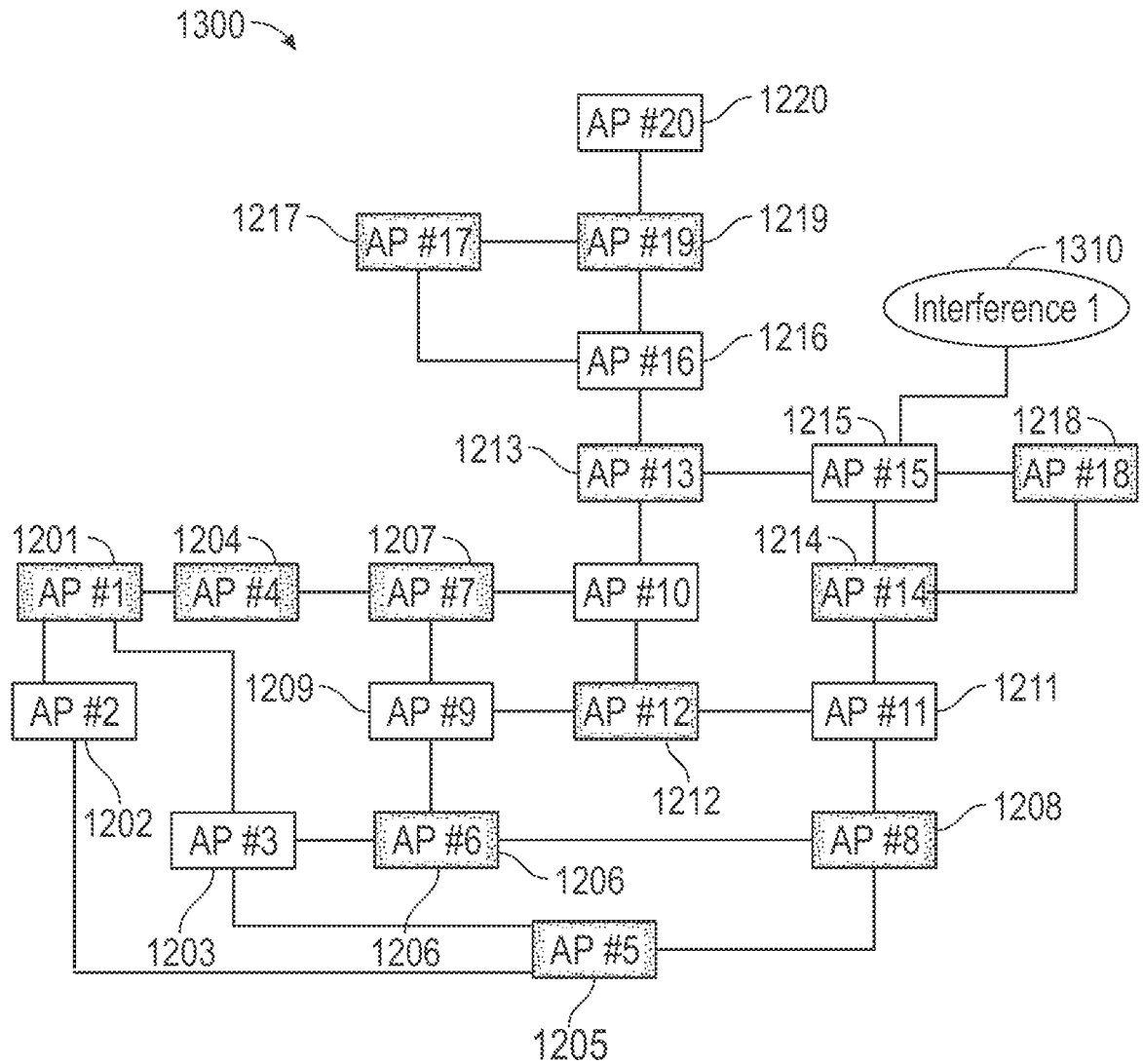
FIG. 13 illustrates a system for an autonomous, artificially intelligent, and fully distributed Wi-Fi system, according to an embodiment.

FIG. 13 illustrates the system 1200 of FIG. 12 including interference ("IF") 1310. The system 1200 is configured to identify the interference 1310 and provide Wi-Fi signals for the system 1200 that do not interfere with the interference 1310. Some of the features in FIG. 13 may be the same as or similar to some of the features in the other FIGs. described herein as noted by same and/or similar reference characters, unless expressly described otherwise. Additionally, reference may be made to features shown in any of the other FIGs. described herein and not shown in FIG. 13.

Figure 14:
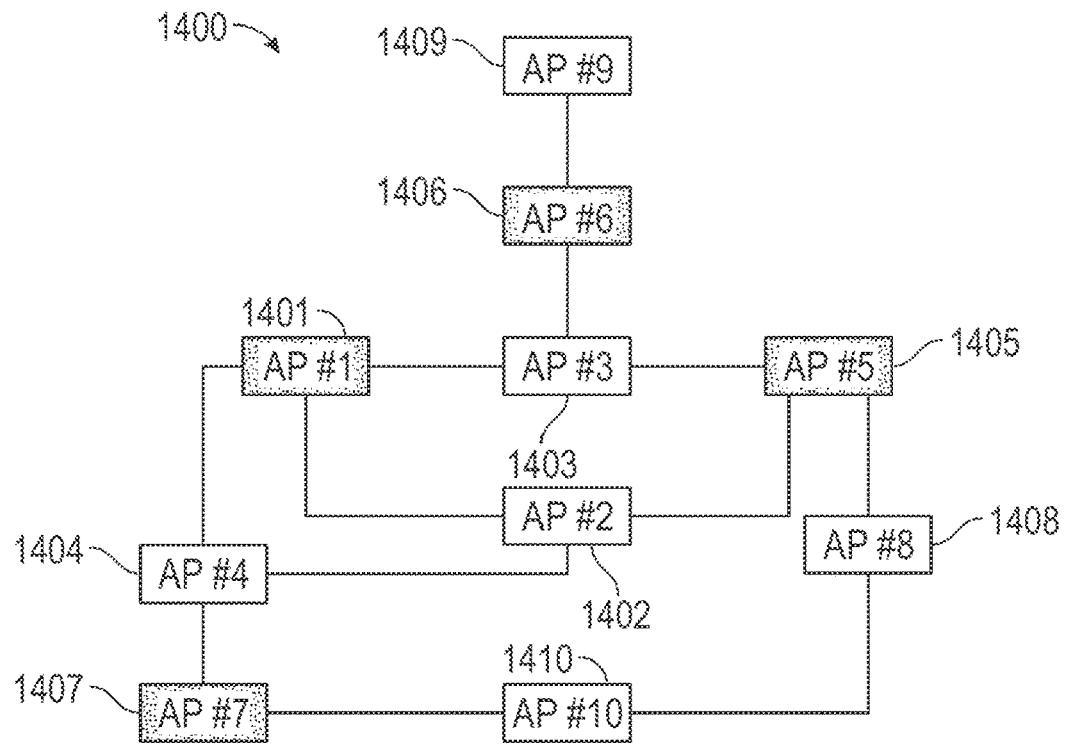
FIG. 14 illustrates a system for an autonomous, artificially intelligent, and fully distributed Wi-Fi system, according to an embodiment.

FIG. 14 illustrates a depiction of a system 1400 including ten access points AP #1 1401, AP #2 1402, AP #3 1403, AP #4 1404, AP #5 1405, AP #6 1406, AP #7 1407, AP #8 1408, AP #9 1409, and AP #10 1410, without any signal interference. The access points ("AP") can interact with each other and are part of the system 1400 for autonomous, artificially intelligent, and fully distributed Wi-Fi infrastructure.

Figure 15:
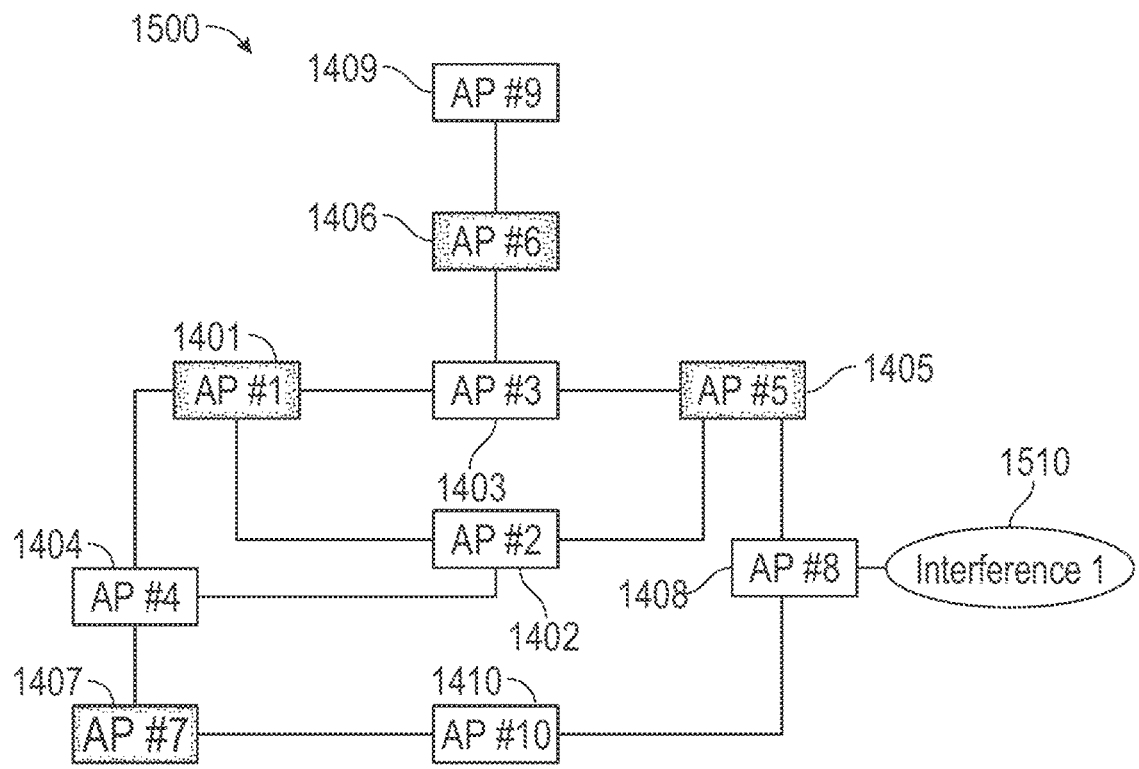
FIG. 15 illustrates a system for an autonomous, artificially intelligent, and fully distributed Wi-Fi system, according to an embodiment.

FIG. 15 illustrates the system 1400 of FIG. 14 including interference 1510. The system 1400 is configured to identify the interference 1510 and provide Wi-Fi signals for the system 1400 that do not interfere with the interference 1510. Some of the features in FIG. 15 may be the same as or similar to some of the features in the other FIGs. described herein as noted by same and/or similar reference characters, unless expressly described otherwise. Additionally, reference may be made to features shown in any of the other FIGs. described herein and not shown in FIG. 15.

Figure 16:
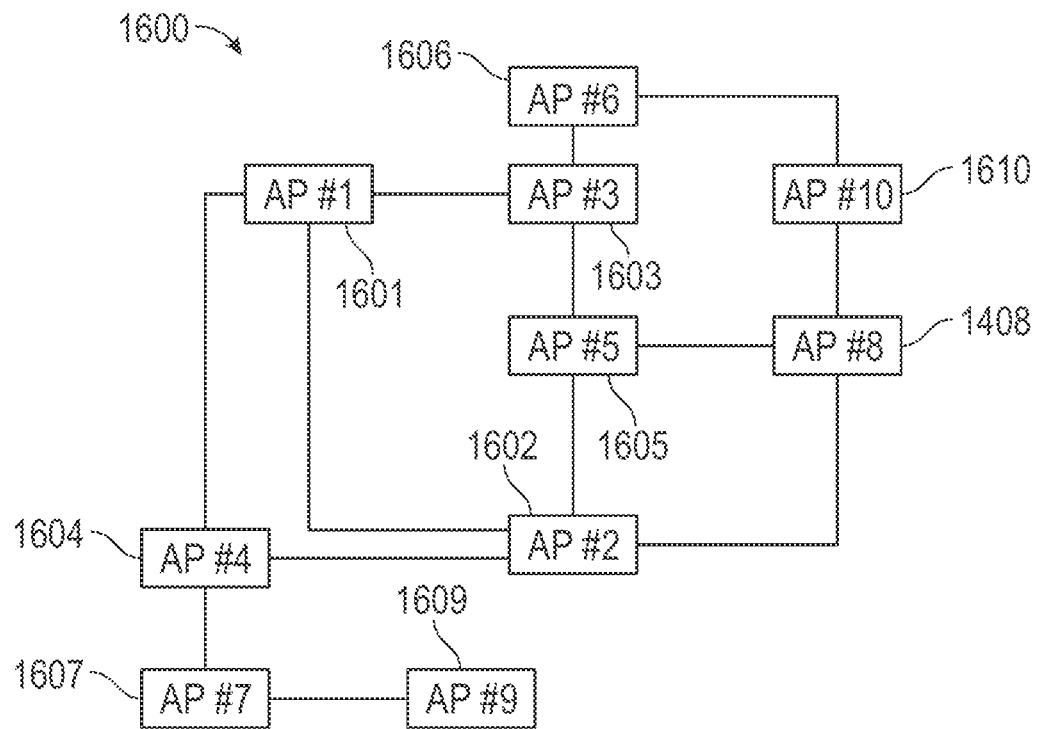
FIG. 16 illustrates a system for an autonomous, artificially intelligent, and fully distributed Wi-Fi system, according to an embodiment.

FIG. 16 illustrates a depiction of a system 1600 including ten access points AP #1 1601, AP #2 1602, AP #3 1603, AP #4 1604, AP #5 1605, AP #6 1606, AP #7 1607, AP #8 1608, AP #9 1609, and AP #10 1610, without any signal interference. The access points ("AP") can interact with each other and are part of the system 1600 for autonomous, artificially intelligent, and fully distributed Wi-Fi infrastructure.

Figure 17:
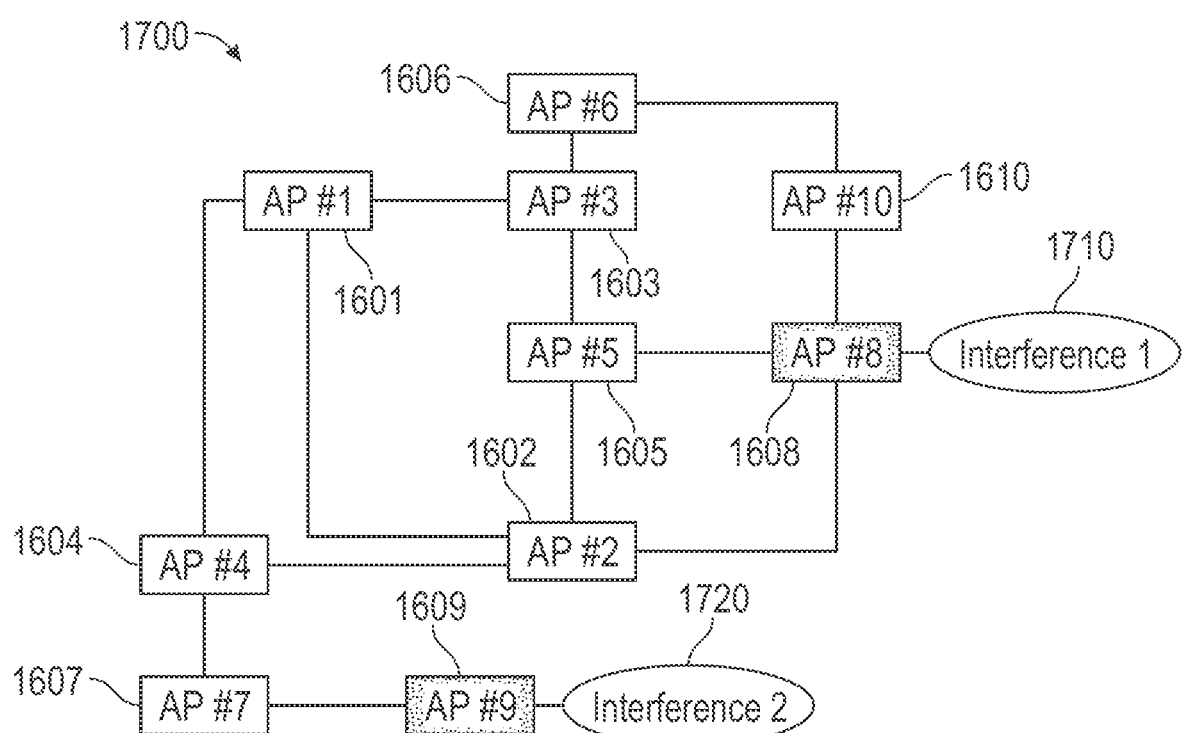
FIG. 17 illustrates a system for an autonomous, artificially intelligent, and fully distributed Wi-Fi system, according to an embodiment.

FIG. 17 illustrates the system 1600 of FIG. 16 including interference 1 1710 and interference 2 1720. The system 1600 is configured to identify the interferences 1710, 1720 and provide Wi-Fi signals for the system 1600 that do not interfere with the interferences 1710, 1720. Some of the features in FIG. 17 may be the same as or similar to some of the features in the other FIGs. described herein as noted by same and/or similar reference characters, unless expressly described otherwise. Additionally, reference may be made to features shown in any of the other FIGs. described herein and not shown in FIG. 17.

Figure 18:
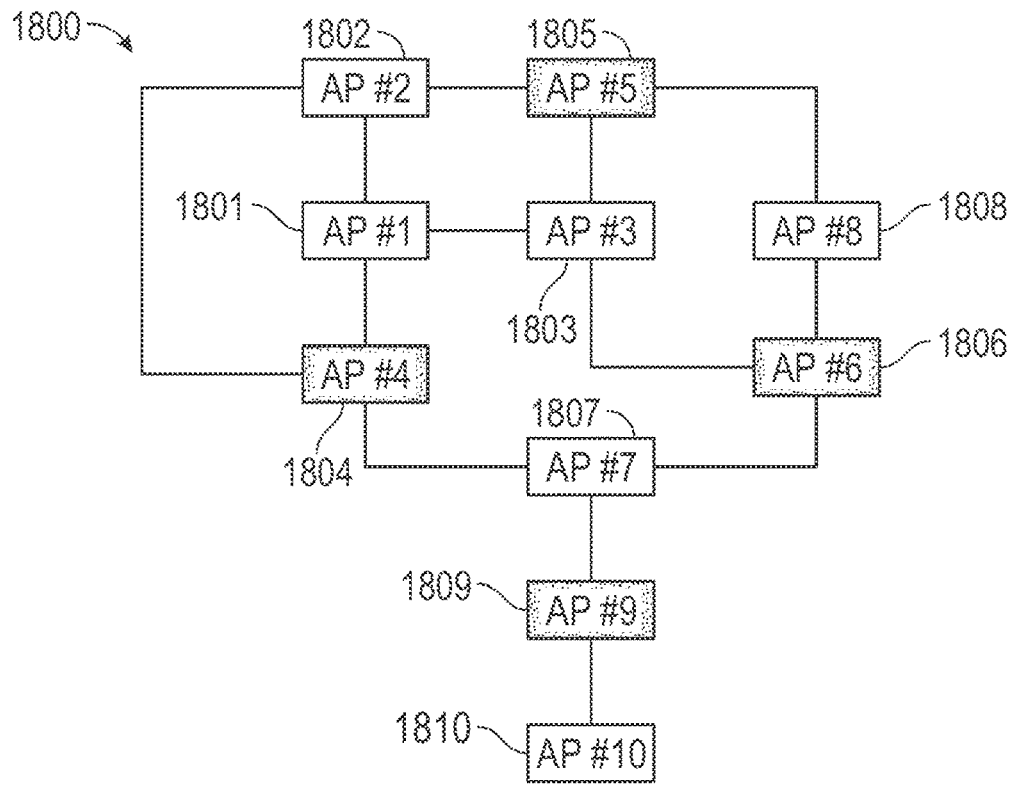
FIG. 18 illustrates a system for an autonomous, artificially intelligent, and fully distributed Wi-Fi system, according to an embodiment.

FIG. 18 illustrates a depiction of a system 1600 including ten access points AP #1 1801, AP #2 1802, AP #3 1803, AP #4 1804, AP #5 1805, AP #6 1806, AP #7 1807, AP #8 1808, AP #9 1809, and AP #10 1810, without any signal interference. The access points ("AP") can interact with each other and are part of the system 1800 for autonomous, artificially intelligent, and fully distributed Wi-Fi infrastructure.

Figure 19:
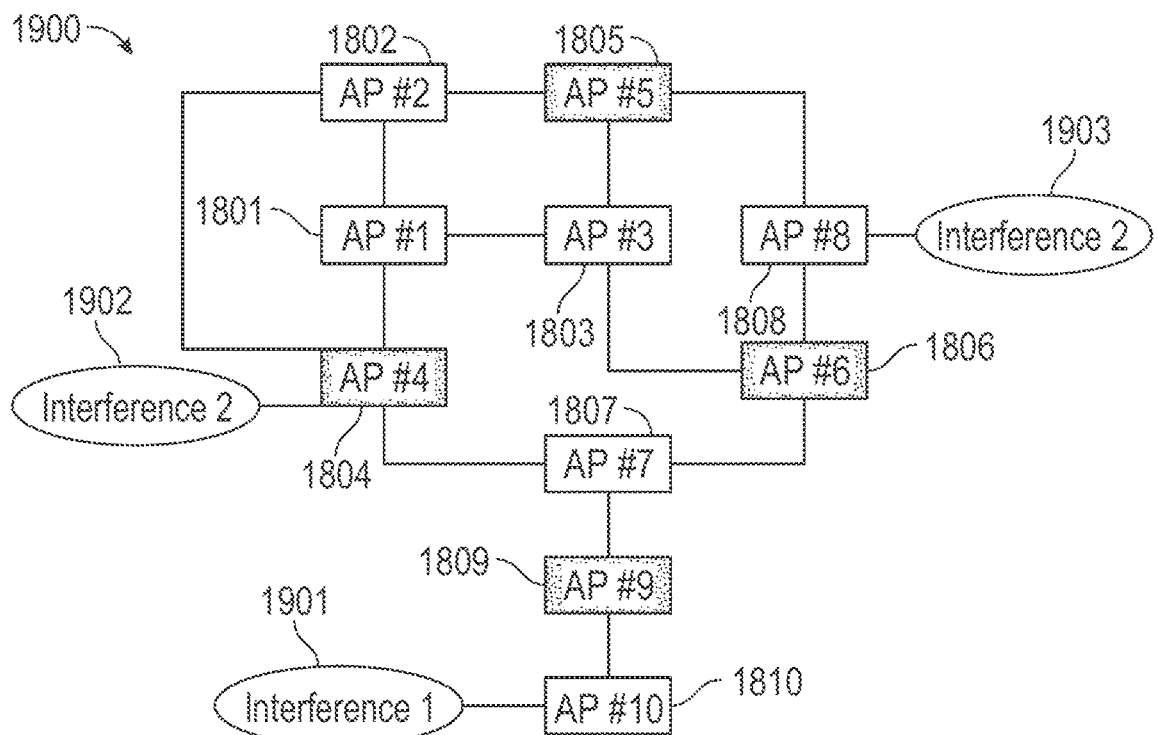
FIG. 19 illustrates a system for an autonomous, artificially intelligent, and fully distributed Wi-Fi system, according to an embodiment.

FIG. 19 illustrates the system 1800 of FIG. 16 including interference 1 1910, interference two 1920, and interference three 1930. The system 1800 is configured to identify the interferences 1910, 1920, 1930 and provide Wi-Fi signals for the system 1800 that do not interfere with the interferences 1910, 1920, 1930. Some of the features in FIG. 19 may be the same as or similar to some of the features in the other FIGs. described herein as noted by same and/or similar reference characters, unless expressly described otherwise. Additionally, reference may be made to features shown in any of the other FIGs. described herein and not shown in FIG. 19.

A feature illustrated in one of the figures may be the same as or similar to a feature illustrated in another of the figures. Similarly, a feature described in connection with one of the figures may be the same as or similar to a feature described in connection with another of the figures. The same or similar features may be noted by the same or similar reference characters unless expressly described otherwise. Additionally, the description of a particular figure may refer to a feature not shown in the particular figure. The feature may be illustrated in and/or further described in connection with another figure.

Elements of processes (i.e., methods) described herein may be executed in one or more ways such as by a human, by a processing device, by mechanisms operating automatically or under human control, and so forth. Additionally, although various elements of a process may be depicted in the figures in a particular order, the elements of the process may be performed in one or more different orders without departing from the substance and spirit of the disclosure herein.

The foregoing description sets forth numerous specific details such as examples of specific systems, components, methods and so forth, in order to provide a good understanding of several implementations. It will be apparent to one skilled in the art, however, that at least some implementations may be practiced without these specific details. In other instances, well-known components or methods are not described in detail or are presented in simple block diagram format in order to avoid unnecessarily obscuring the present implementations. Thus, the specific details set forth above are merely exemplary. Particular implementations may vary from these exemplary details and still be contemplated to be within the scope of the present implementations.

Related elements in the examples and/or embodiments described herein may be identical, similar, or dissimilar in different examples. For the sake of brevity and clarity, related elements may not be redundantly explained. Instead, the use of a same, similar, and/or related element names and/or reference characters may cue the reader that an element with a given name and/or associated reference character may be similar to another related element with the same, similar, and/or related element name and/or reference character in an example explained elsewhere herein. Elements specific to a given example may be described regarding that particular example. A person having ordinary skill in the art will understand that a given element need not be the same and/or similar to the specific portrayal of a related element in any given figure or example in order to share features of the related element.

It is to be understood that the foregoing description is intended to be illustrative and not restrictive. Many other implementations will be apparent to those of skill in the art upon reading and understanding the above description. The scope of the present implementations should, therefore, be determined with reference to the appended claims, along with the full scope of equivalents to which such claims are entitled.

The foregoing disclosure encompasses multiple distinct examples with independent utility. While these examples have been disclosed in a particular form, the specific examples disclosed and illustrated above are not to be considered in a limiting sense as numerous variations are possible. The subject matter disclosed herein includes novel and non-obvious combinations and sub-combinations of the various elements, features, functions and/or properties disclosed above both explicitly and inherently. Where the disclosure or subsequently filed claims recite "a" element, "a first" element, or any such equivalent term, the disclosure or claims is to be understood to incorporate one or more such elements, neither requiring nor excluding two or more of such elements.

As used herein "same" means sharing all features and "similar" means sharing a substantial number of features or sharing materially important features even if a substantial number of features are not shared. As used herein "may" should be interpreted in a permissive sense and should not be interpreted in an indefinite sense. Additionally, use of "is" regarding examples, elements, and/or features should be interpreted to be definite only regarding a specific example and should not be interpreted as definite regarding every example. Furthermore, references to "the disclosure" and/or "this disclosure" refer to the entirety of the writings of this document and the entirety of the accompanying illustrations, which extends to all the writings of each subsection of this document, including the Title, Background, Brief description of the Drawings, Detailed Description, Claims, Abstract, and any other document and/or resource incorporated herein by reference.

As used herein regarding a list, "and" forms a group inclusive of all the listed elements. For example, an example described as including A, B, C, and D is an example that includes A, includes B, includes C, and also includes D. As used herein regarding a list, "or" forms a list of elements, any of which may be included. For example, an example described as including A, B, C, or D is an example that includes any of the elements A, B, C, and D. Unless otherwise stated, an example including a list of alternatively-inclusive elements does not preclude other examples that include various combinations of some or all of the alternatively-inclusive elements. An example described using a list of alternatively-inclusive elements includes at least one element of the listed elements. However, an example described using a list of alternatively-inclusive elements does not preclude another example that includes all of the listed elements. And, an example described using a list of alternatively-inclusive elements does not preclude another example that includes a combination of some of the listed elements. As used herein regarding a list, "and/or" forms a list of elements inclusive alone or in any combination. For example, an example described as including A, B, C, and/or D is an example that may include: A alone; A and B; A, B and C; A, B, C, and D; and so forth. The bounds of an "and/or" list are defined by the complete set of combinations and permutations for the list.

Where multiples of a particular element are shown in a FIG., and where it is clear that the element is duplicated throughout the FIG., only one label may be provided for the element, despite multiple instances of the element being present in the FIG. Accordingly, other instances in the FIG. of the element having identical or similar structure and/or function may not have been redundantly labeled. A person having ordinary skill in the art will recognize based on the disclosure herein redundant and/or duplicated elements of the same FIG. Despite this, redundant labeling may be included where helpful in clarifying the structure of the depicted examples.

The Applicant(s) reserves the right to submit claims directed to combinations and sub-combinations of the disclosed examples that are believed to be novel and non-obvious. Examples embodied in other combinations and sub-combinations of features, functions, elements and/or properties may be claimed through amendment of those claims or presentation of new claims in the present application or in a related application. Such amended or new claims, whether they are directed to the same example or a different example and whether they are different, broader, narrower or equal in scope to the original claims, are to be considered within the subject matter of the examples described herein.

The invention claimed is:

1. A system comprising:
a first node, wherein the first node comprises a sensing Wi-Fi radio, a data Wi-Fi radio, a first processing device, a first memory device and a software module, wherein:
the sensing Wi-Fi radio is configured to detect and receive sensor data comprising Wi-Fi frequencies, Wi-Fi hardware addresses, Wi-Fi metadata and content via said first processing device from Wi-Fi devices;
the data Wi-Fi radio comprises a second processing device, and the data Wi-Fi radio is configured to send and receive data over Wi-Fi frequencies; and
the software module comprises a sensor module, an accumulator module, a solver module and a configuration generator module, and
the system further comprising:
a second node, wherein the second node comprises a second sensing Wi-Fi radio, a second data Wi-Fi radio, a third processing device, a second memory device and the software module;
a third node, wherein the third node comprises a third sensing Wi-Fi radio, a third data Wi-Fi radio, a fourth processing device, a third memory device and the software module; and
a fourth node, wherein the fourth node comprises a fourth sensing Wi-Fi radio, a fourth data Wi-Fi radio, a fifth processing device, a fourth memory device and the software module;
wherein:
the sensor module is configured to receive sensor data from said sensing Wi-Fi radio and create sensor module data that comprises Wi-Fi frequencies and Wi-Fi hardware addresses;
the accumulator module is configured to receive the sensor module data and process the sensor module data via the first processing device and compare the sensor module data to Wi-Fi frequency data stored on the memory device to generate a list of invalid Wi-Fi frequencies and access points;
the solver module is configured to receive the list of invalid Wi-Fi frequencies and access points and process the list of invalid Wi-Fi frequencies and access points via the processing device to generate a Wi-Fi configuration for the node; and
the configuration generator module is configured to receive Wi-Fi configuration for the node and process the Wi-Fi configuration for the node via the processing device to generate a Wi-Fi configuration code for the data Wi-Fi radio, wherein the configuration generator module sends the Wi-Fi configuration code to the data Wi-Fi radio via the processing device, and the Wi-Fi configuration code is received via the processing device on the data Wi-Fi radio.

2. The system of claim 1, further comprising:
a network switch that provides power to the nodes and connects the data Wi-Fi radios to a hardwired network, and wherein the first sensing Wi-Fi radio, the first data Wi-Fi radio, the first processing device, the first memory device and the software module are located on a single board computer.

3. The system of claim 1, wherein the sensor module on the first node is configured to send the sensor module data to the accumulator module on the second node, the third node and the fourth node via the first processing device.

4. The system of claim 3, wherein the solver module on the first node is configured to send the Wi-Fi configuration for the first node to the solver module on the second node, the third node and the fourth node, and wherein the configuration generator module is configured to process the Wi-Fi configuration for the first node, the second node, the third node and the fourth node and generate a Wi-Fi configuration code.

5. The system of claim 4, wherein the solver module is configured to process the list of invalid frequencies and access points, and compare the access points to data stored on the first memory device, and wherein the solver module uses a graph coloring algorithm to prevent external co-channel interference via said first processing device.

6. The system of claim 5, comprising an operating system selected from Linux, IOS, or Android, and wherein the software modules are written in Python 3.8.

7. A method comprising:
providing radio resource management to avoid co-channel interference and improve network performance comprising:
a node comprising a sensing Wi-Fi radio, a data Wi-Fi radio, a processor, a memory device, and a software module, wherein the software module comprises a sensor module, an accumulator module, a solver module, and configuration generator module, the method further comprising:
scanning for Wi-Fi frequencies in a coverage area via a sensing Wi-Fi radio, wherein the scanning generates sensor data comprising, content, metadata, Wi-Fi frequencies and Wi-Fi hardware addresses;
sending sensor data from the sensing Wi-Fi radio to a sensor module;
processing the sensor data in the sensor module via a processing device to generate sensor module data, and sending the sensor module data to an accumulator module via said processing device;
processing the sensor module data in the accumulator module via the processing device to generate a list of invalid Wi-Fi frequencies and access points, and sending the list of invalid Wi-Fi frequencies and access points to a solver module via the processing device;
processing the list of invalid Wi-Fi frequencies in the solver module via the processing device to generate a Wi-Fi configuration, and sending the Wi-Fi configuration to a configuration generator module via the processing device; and
processing the Wi-Fi configuration in the configuration generator module via the processing device to generate a Wi-Fi configuration code and sending the Wi-Fi configuration code to a data Wi-Fi radio via the processing device;
wherein the node is a single board computer.

8. The method of claim 7, wherein the single board computer is a first node of a Wi-Fi network, and the Wi-Fi network further comprises a second node, a third node and a fourth node, wherein:
the second node comprises a second single board computer further comprising a second sensing Wi-Fi radio, a second data Wi-Fi radio, a second processing device, and a second memory device;
the third node comprises a third single board computer further comprising a third sensing Wi-Fi radio, a third data Wi-Fi radio, a third processing device, and a third memory device; and
the fourth node comprises a fourth single board computer further comprising a fourth sensing Wi-Fi radio, a fourth data Wi-Fi radio, a fourth processing device, and a fourth memory device.

9. The method of claim 8, wherein the sensor module is configured to send sensor module data to the second node, the third node and the fourth node via said processing device, and wherein the sensor module data is sent via a user datagram protocol broadcast.

10. The method of claim 8, wherein the accumulator module is configured to compare a list of Wi-Fi frequencies stored on the memory device with the sensor module data received from the sensor module via the processing device.

11. The method of claim 10, wherein:
the solver module on the first node is configured to generate a Wi-Fi configuration for the first node via the first processing device, the solver module on the second node is configured to generate a Wi-Fi configuration for the second node via the second processing device; and
the solver module on the third node is configured to generate a Wi-Fi configuration for the third node via the third processing device, and the solver module on the fourth node is configured to create a Wi-Fi configuration for the fourth node via said fourth processing device.

12. The method of claim 11, further comprising a voting system to ensure a majority of the nodes agree with a network Wi-Fi configuration, wherein the nodes are configured to send Wi-Fi configurations via the processing device that are verified by a graph coloring algorithm, and the configuration generator module is configured to wait until more than 50% of the nodes send matching Wi-Fi configuration via the processing device before the configuration generator module processes the Wi-Fi configurations and executes a Wi-Fi configuration code via the processing device.

13. The method of claim 12, wherein:
after the configuration generator module identifies a network Wi-Fi configuration via the processing device, the configuration generator module rewrites the Wi-Fi configuration code according to the network Wi-Fi configuration; and
the configuration generator restarts the Wi-Fi configuration code to apply the network Wi-Fi configuration.

14. The method of claim 12, wherein:
the voting system does not reach a majority of the nodes, the configuration generator modules stores Wi-Fi configurations for the nodes in a memory device; and
the Wi-Fi configurations for the nodes remain unchanged.

15. A system comprising:
a node, wherein the node comprises a sensing Wi-Fi radio, a data Wi-Fi radio, a processing device, a memory device and a software module, wherein:

the sensing Wi-Fi radio is configured to detect and receive sensor data comprising Wi-Fi frequencies, Wi-Fi hardware data, Wi-Fi metadata and content via said processing device from Wi-Fi devices;

the data Wi-Fi radio is configured to send and receive data over Wi-Fi frequencies; and the software module comprises a sensor module, an accumulator module, a solver module and a configuration generator module, wherein:

the sensor module is configured to receive sensor data from said sensing Wi-Fi radio and create sensor module data comprising content and metadata;

the accumulator module is configured to receive the sensor module data and process the sensor module data via the processing device and compare the sensor module data to Wi-Fi frequency data stored on the memory device to generate a list of invalid Wi-Fi frequencies and access points;

the solver module is configured to receive the list of invalid Wi-Fi frequencies and process the list of invalid Wi-Fi frequencies and access points via the processing device to generate a Wi-Fi configuration for the node; and the configuration generator module is configured to receive the Wi-Fi configuration for the node and process the Wi-Fi configuration for the node via the processing device to generate a Wi-Fi configuration code for the data Wi-Fi radio, wherein the configuration generator module sends the Wi-Fi configuration code to the data Wi-Fi radio via the processing device.

16. The system of claim 15, wherein:

the accumulator module is configured to comprises two local data structures;

the local data structures are access points and banned frequencies; and the accumulator module analyzes the senor module data for Wi-Fi hardware addresses via the processing device to determines if the sensor module data is stored under access points or banned frequencies.

17. The system of claim 16, wherein:

the accumulator module identifies Wi-Fi hardware addresses that are stored in the memory device as network Wi-Fi addresses via the processing device;

the accumulator module stores identified network Wi-Fi addresses under access points, and wherein the accumulator module identifies Wi-Fi hardware addresses that are not stored in the memory device as co-channel interference Wi-Fi addresses via the processing device; and the accumulator module stores identified co-channel interference Wi-Fi addresses under banned channels.

18. The system of claim 17, wherein:

the solver module analyzes the banned channels and the access points via a processing device to generate a radiofrequency adjacency map of all the access points and banned channels; and the solver module analyzes the radiofrequency adjacency map using a graph coloring algorithm via the processing device to generate a network Wi-Fi configuration.

19. The system of claim 18, wherein:

the solver module sends the network Wi-Fi configuration to the configuration generator module via a processing device;

the configuration generator module is configured to generate a Wi-Fi configuration code based on the network Wi-Fi configuration; and the configuration generator module uses global radio resource management to minimizes co-channel interference to improve network performance.

20. The system of claim 15, wherein the node is configured to be powered via battery, solar power, wind power, hard wired to an electric system, or powered via power over ethernet.

\* \* \* \* \*